(12) United States Patent
Koide

(10) Patent No.: US 9,292,193 B2
(45) Date of Patent: Mar. 22, 2016

(54) DISPLAY DEVICE, DISPLAY DRIVING METHOD, AND ELECTRONIC APPARATUS

(71) Applicant: Japan Display Inc., Tokyo (JP)

(72) Inventor: Gen Koide, Aichi (JP)

(73) Assignee: Japan Display Inc., Tokyo (JP)

( * ) Notice: Subject to any disclaimer, the term of this patent is extended or adjusted under 35 U.S.C. 154(b) by 333 days.

(21) Appl. No.: 13/689,092

(22) Filed: Nov. 29, 2012

(65) Prior Publication Data
US 2013/0234954 A1 Sep. 12, 2013

(30) Foreign Application Priority Data
Mar. 6, 2012 (JP) ................................. 2012-049117

(51) Int. Cl.
| | |
|---|---|
| *G06F 3/041* | (2006.01) |
| *G06F 3/0488* | (2013.01) |
| *G09G 1/00* | (2006.01) |
| *G06F 3/044* | (2006.01) |
| *G09G 3/36* | (2006.01) |

(52) U.S. Cl.
CPC .............. *G06F 3/0488* (2013.01); *G06F 3/044* (2013.01); *G06F 3/0412* (2013.01); *G06F 3/0416* (2013.01); *G09G 1/005* (2013.01); *G09G 3/3648* (2013.01); *G09G 3/3614* (2013.01); *G09G 2310/0248* (2013.01); *G09G 2310/0297* (2013.01); *G09G 2320/0214* (2013.01); *G09G 2330/021* (2013.01)

(58) Field of Classification Search
CPC .............. G09G 2320/0209; G09G 2310/0251; G09G 3/3611; G09G 3/3607; G09G 2320/0214; G09G 3/325; G09G 2310/0248; G09G 3/3648
See application file for complete search history.

(56) References Cited

U.S. PATENT DOCUMENTS

| | | | | |
|---|---|---|---|---|
| 5,748,169 | A * | 5/1998 | Okumura et al. ............. | 345/100 |
| 8,704,733 | B2 * | 4/2014 | Cowan et al. ..................... | 345/6 |
| 2004/0150600 | A1* | 8/2004 | Kojima et al. .................. | 345/96 |

(Continued)

FOREIGN PATENT DOCUMENTS

| | | |
|---|---|---|
| JP | 10-143113 B1 | 5/1998 |
| JP | 10-171422 | 6/1998 |

(Continued)

OTHER PUBLICATIONS

Japanese Office Action issued Mar. 24, 2015 for corresponding Japanese Application No. 2012-049117.

*Primary Examiner* — Amare Mengistu
*Assistant Examiner* — Gloryvid Figueroa-Gibson
(74) *Attorney, Agent, or Firm* — Michael Best & Friedrich LLP

(57) ABSTRACT

A display device includes: a pixel array portion in which plural pixels in which display gradations are controlled based on written pixel signals are disposed in row and column directions; plural scanning lines disposed in the pixel array portion and supplying scanning pulses for the pixels in the rows; plural signal lines disposed in the pixel array portion and supplying the pixel signals for the pixels in the columns; a scanning line driver successively supplying the scanning pulses to the plural scanning lines and causing the pixels in the rows to carry out write of the pixel signals; and a signal line driver outputting the pixel signals for the pixels to the plural signal lines, and intermittently outputting a charge voltage with lower electric potential than a predetermined pixel signal voltage once or more for one frame period of time to each of the plural signal lines.

8 Claims, 18 Drawing Sheets

(56) References Cited

U.S. PATENT DOCUMENTS

| | | | |
|---|---|---|---|
| 2005/0156820 A1* | 7/2005 | Aoki | 345/58 |
| 2007/0080905 A1* | 4/2007 | Takahara | 345/76 |
| 2009/0073095 A1* | 3/2009 | Uchino et al. | 345/77 |
| 2009/0135113 A1* | 5/2009 | Taneda et al. | 345/76 |
| 2010/0110114 A1* | 5/2010 | Hashimoto | 345/691 |
| 2011/0109605 A1* | 5/2011 | Omori et al. | 345/207 |

FOREIGN PATENT DOCUMENTS

| | | |
|---|---|---|
| JP | 2003-202847 | 7/2003 |
| JP | 2006-259224 A | 9/2006 |
| JP | 2009-092787 A | 4/2009 |

* cited by examiner

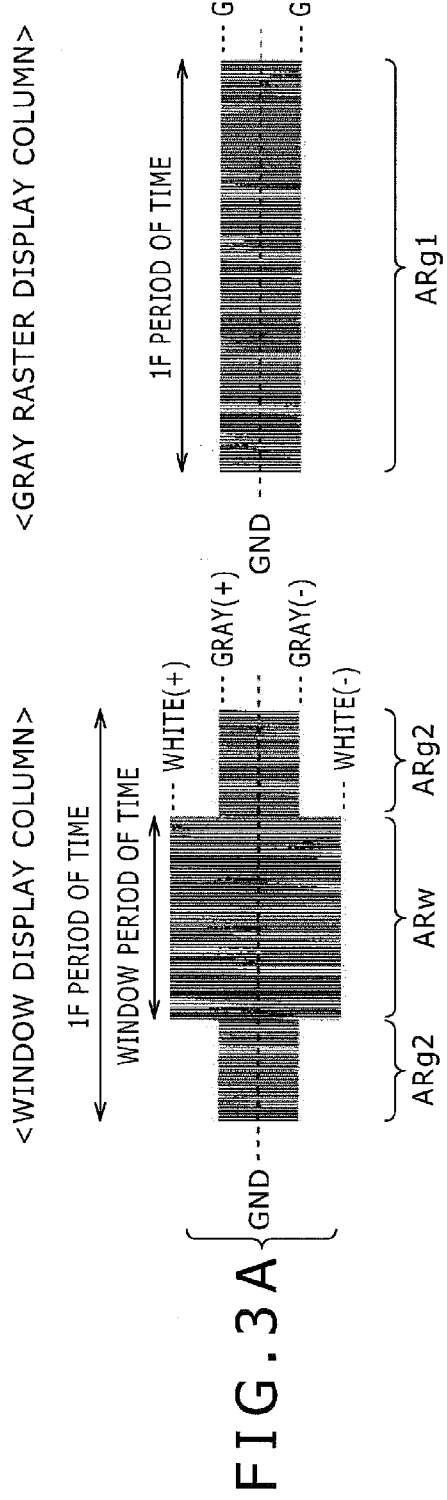
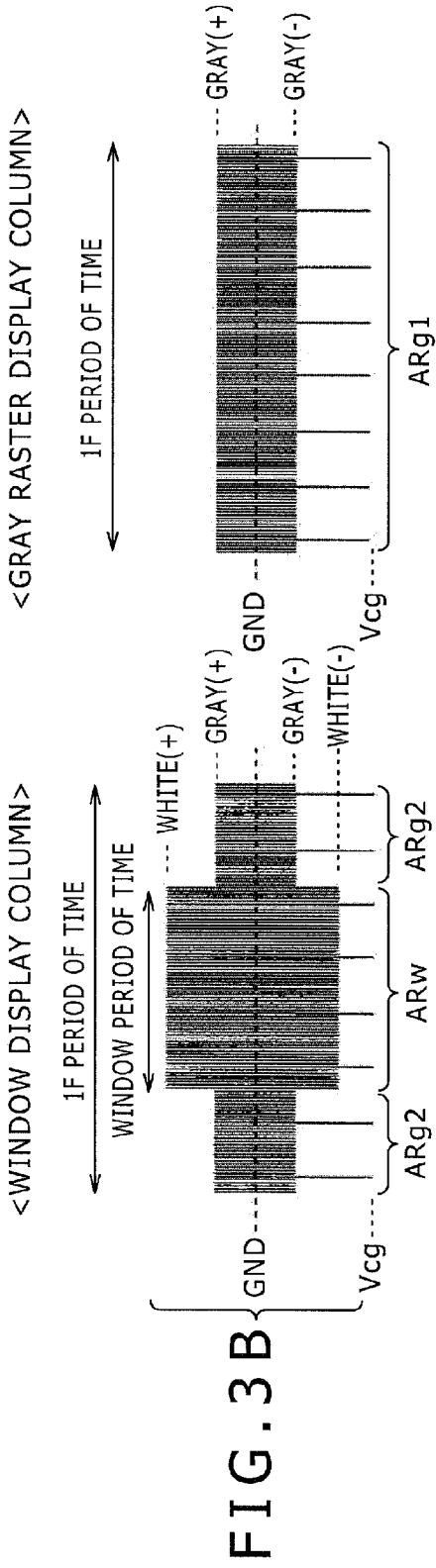
FIG. 3A
FIG. 3B

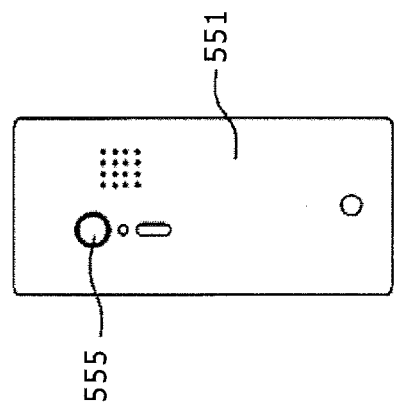
FIG.20A
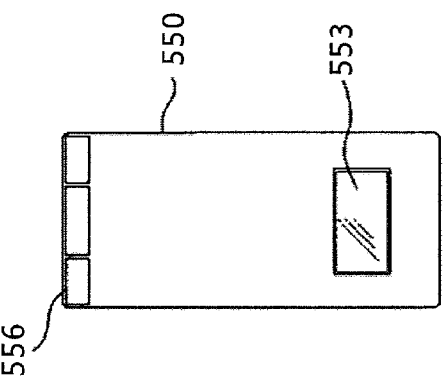
FIG.20B
FIG.20C
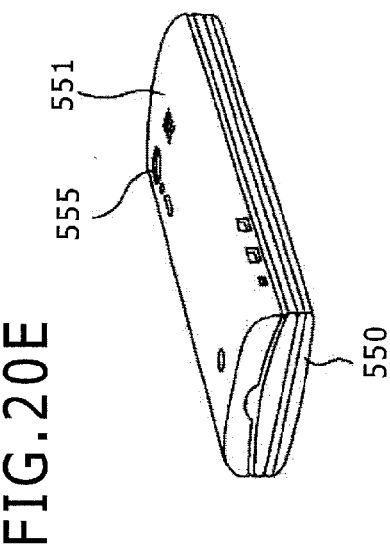
FIG.20D
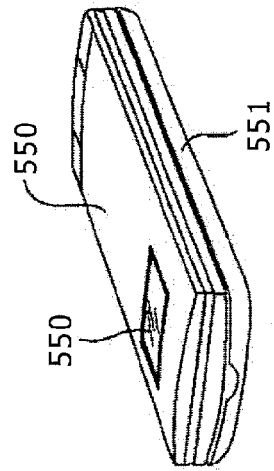
FIG.20E

DISPLAY DEVICE, DISPLAY DRIVING METHOD, AND ELECTRONIC APPARATUS

BACKGROUND

The present disclosure relates to a display device, a display driving method used in the same, and an electronic apparatus including the same.

In recent years, a display device has been mounted to various kinds of electronic apparatuses. As far as the display device concerned, various kinds of display devices such as a liquid crystal display device, a plasma display device, and an organic Electroluminescence (EL) display device have been developed from a viewpoint of image quality, power consumption, and the like. These display devices are applied to various kinds of electronic apparatuses such as a mobile phone, and a personal digital assistance in addition to a stationary television set in accordance with the characteristics thereof.

Now, an existing active matrix type display device involves a problem that a trouble called a longitudinal cross talk is caused due to a leakage current from a transistor within a pixel circuit, so that an image quality is reduced.

For this reason, as described in Japanese Patent Laid-Open Nos. Hei 10-171422, Hei 10-143113, and 2003-202847, it is proposed that a signal line is precharged at a predetermined level, thereby improving the longitudinal cross talk.

However, since the precharge is carried out, it may be impossible to avoid an increase in the power consumption.

The present disclosure has been made in order to solve the problems described above, and it is therefore desirable to provide a display device in which a longitudinal cross talk can be improved to enhance a display quality, and especially low power consumption can be realized, a display driving method used in the same, and an electronic apparatus including the same.

In order to attain the desire described above, according to an embodiment of the present disclosure, there is provided a display device including: a pixel array portion in which plural pixels in which display gradations are controlled in accordance with written pixel signals are disposed in a row direction and in a column direction; and plural scanning lines disposed in the pixel array portion and supplying scanning pulses for the pixels in the rows. The display device further includes: plural signal lines disposed in the pixel array portion and supplying the pixel signals for the pixels in the columns; a scanning line driver successively supplying the scanning pulses to the plural scanning lines and causing the pixels in the rows to carry out write of the pixel signals outputted to the signal lines; and a signal line driver outputting the pixel signals for the pixels to the plural signal lines, and intermittently outputting a charge voltage with lower electric potential than a predetermined pixel signal voltage once or more for one frame period of time to each of the plural signal lines.

Further, there is provided an electronic apparatus including the display device.

According to another embodiment of the present disclosure, there is provided a display driving method for use in a display device including a pixel array portion in which plural pixels in which display gradations are controlled in accordance with written pixel signals are disposed in a row direction and in a column direction, plural scanning lines disposed in the pixel array portion and supplying scanning pulses for the pixels in the rows, plural signal lines disposed in the pixel array portion and supplying the pixel signals for the pixels in the columns, a scanning line driver, and a signal line driver. The display driving method includes: successively supplying the scanning pulses to the plural scanning lines and causing the pixels in the rows to carry out write of the pixel signals outputted to the signal lines by the scanning line driver; and outputting the pixel signals for the pixels to the plural signal lines, and intermittently outputting a charge voltage with lower electric potential than a predetermined pixel signal voltage once or more for one frame period of time to each of the plural signal lines by the signal line driver.

In the embodiments of the present disclosure, the charge voltage is supplied to each of the signal lines once or more for one frame period of time.

By supplying the charge voltage to each of the signal lines in such a manner, an electric potential of a channel portion of a pixel transistor in the pixel is prevented from becoming higher than the electric potential of the pixel signal written to a pixel capacitor due to a leakage current. As a result, an error in a display luminance among the pixels is dissolved, thereby improving the longitudinal cross talk. As the charge voltage is intermittently applied, thereby realizing the reduction in the power consumption.

As set forth hereinabove, according to the embodiment of the present disclosure, the longitudinal cross talk can be improved, thereby enhancing the display image quality. Also, it is possible to reduce the power consumption when such an operation is carried out.

BRIEF DESCRIPTION OF THE DRAWINGS

FIGS. 3A and 3B are waveform charts explaining intermittent application of a charge voltage in the display device according to the first embodiment of the present disclosure;

FIGS. 20A to 20E are respectively a front view showing an external appearance of a manipulation portion and a display portion in a mobile phone as a fifth example of application in a state in which a chassis is opened and to which the display device according to the first embodiment of the present disclosure is applied, a top plan view showing an external appearance of an upper surface side thereof in a state in which the chassis is closed, a bottom plan view showing an external appearance of a bottom surface side thereof in the state in which the chassis is closed, a perspective view showing an external appearance of the upper surface side thereof in the state in which the chassis is closed, and a perspective view showing an external appearance of the bottom surface side thereof in which the chassis is closed.

DETAILED DESCRIPTION OF THE PREFERRED EMBODIMENTS

Figure 1:
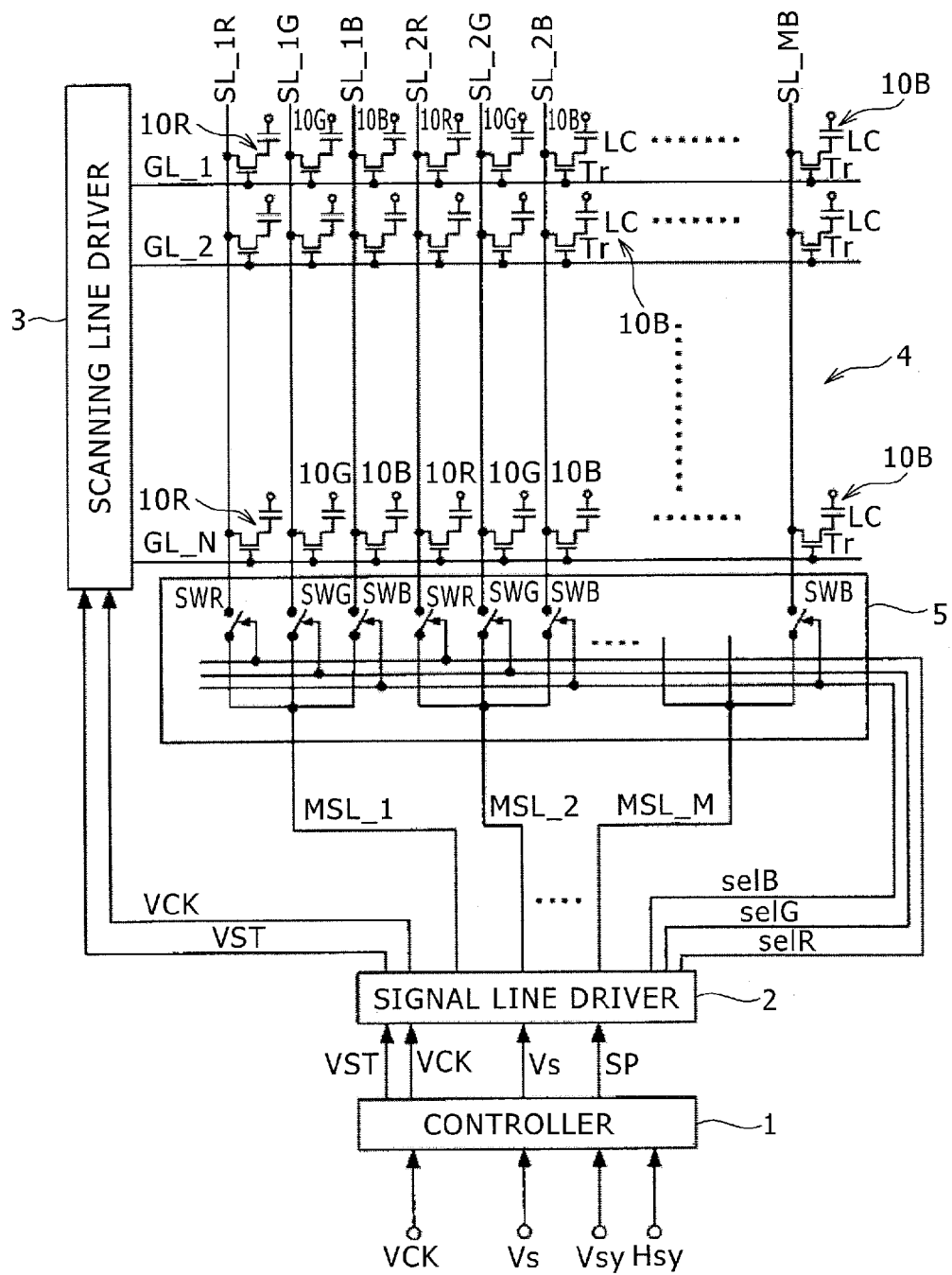
FIG. 1 is a circuit diagram, partly in block, showing a configuration of a display device as a display device according to a first embodiment of the present disclosure.

Embodiments of the present disclosure will be described in detail hereinafter with reference to the accompanying drawings. It is noted that the description will be given below in accordance with the following order.

1. First Embodiment (Display Device)
1-1. Configuration of Display Device
1-2. Intermittent Application of Charge Voltage for Solving Longitudinal Cross Talk
2. Second Embodiment (Display Device)
3. Concrete Examples of First and Second Embodiments (Display Device)
4. Third Embodiment (Display Device)
5. Modified Changes
6. Fourth Embodiment (Electronic Apparatus)
7. Examples of Application (Electronic Apparatus)

1. First Embodiment (Display Device)

1-1. Configuration of Display Device

A configuration of a liquid crystal display device as a display device according to a first embodiment of the present disclosure will be described hereinafter with reference to FIG. 1.

This liquid crystal display device is an example of a display device utilizing an active matrix system. As shown in FIG. 1, this liquid crystal display device includes a controller 1, a signal line driver 2, a scanning line drive 3, a pixel array 4, and a selection switch portion 5.

The pixel array 4 is configured such that plural pixels 10 (10R, 10G, and 10B) in which display gradations are controlled in accordance with pixel signals written thereto, respectively, are disposed in a matrix in a row direction and in a column direction.

In FIG. 1, each of the plural pixels 10 (10R, 10G, and 10B) is shown so as to be composed of a pixel transistor Tr and a liquid crystal cell LC. Various kinds of examples are considered for a circuit composing a liquid crystal pixel. In this case, for convenience of the description, the circuit composing the liquid crystal pixel is merely simply shown. In addition, the liquid crystal cell LC is represented by a mark of a capacitor from the meaning of a pixel capacitor which holds therein a pixel signal voltage written thereto.

The pixel 10R, the pixel 10G, and the pixel 10B represent a Red (R) pixel, a Green (G) pixel, and a Blue (B) pixel, respectively. The pixels 10R, 10G, and 10B are so-called sub-pixels. Thus, one color pixel is composed of the three sub-pixels. The pixels 10 compose a matrix having N rows and M columns, that is, N×M in terms of the color pixel units. The pixels 10 are disposed in N×3M, thereby composing a matrix having N rows and 3M columns in terms of the sub-pixel units.

Although not illustrated, color filters of R, G, and B are disposed so as to correspond to the R pixel, the G pixel, and the B pixel, respectively. The R pixels, the G pixels, and the B pixels, for example, are disposed as shown in FIG. 1, thereby composing a color display screen.

It is noted that the three primary color configuration having the R pixels, the G pixels, and the B pixels is adopted here, for example, in addition to the R pixels, the G pixels, and the B pixels, a white (W) pixels are provided in some cases.

In the following description, when the sub-pixels need not to be especially distinguished, the sub-pixels are spelled as "the pixels 10."

Each of the pixels 10 is composed of at least a pixel transistor Tr (for example, an N-channel TFT) such as a Thin Film Transistor (TFT), and the liquid crystal cell LC.

A gate electrode (control terminal) of the pixel transistor Tr is connected to a scanning line GL (any one of scanning lines GL_1 to GL_N), and one (input terminal) of a source electrode and a drain electrode thereof is connected to a signal line SL (any one of signal lines SL_1R to SL_MB).

A pixel electrode of the liquid crystal cell LC is connected to the other terminal (output terminal) of the source electrode and the drain electrode of the pixel transistor Tr, and a counter electrode thereof is connected to a Vcom line (common electrode) (not shown).

In each of the pixels 10, a scanning pulse is applied to the scanning line GL (GL_1 to GL_N), thereby causing the pixel transistor Tr to conduct. In this case, the pixel signal voltage (gradation value) given to the signal line SL is inputted to the liquid crystal cell LC of the pixel 10 concerned.

A transmittance is controlled in accordance with the pixel signal voltage written to the liquid crystal cell LC, and thus a display luminance of a light emitted from a backlight (not shown) is controlled.

For the pixel array 4, the scanning lines GL (GL_1 to GL_N) are disposed so as to correspond to the pixels 10 belonging to the respective lines.

The scanning line driver 3 successively drives the scanning lines GL_1 to GL_N for one frame period of time. In a word, the scanning line driver 3 successively applies the scanning pulse to the scanning lines GL_1 to GL_N.

In addition, the signal lines SL (SL_1R, SL_1G, SL_1B, SL_2R, ..., SL_MB) are disposed so as to correspond to the pixels 10 belonging to the respective columns.

The pixel signals are supplied to the pixel columns of the R pixels 10R through the signal lines SL_1R, SL_2R, ....

The pixel signals are supplied to the pixel columns of the G pixels 10G through the signal lines SL_1G, SL_2G, ....

Also, the pixel signals are supplied to the pixel columns of the B pixels 10B through the signal lines SL_1B, SL_2B, ....

The signal line driver 2 outputs the pixel signals for the pixels 10 to plural signal lines SL disposed in the pixel array 4 at a polarity corresponding to a polarity signal SP every line period of time.

A video signal Vs, a vertical clock VCK, a vertical synchronous signal Vsy, and a horizontal synchronous signal Hsy are supplied to the controller 1.

For carrying out the display in the pixel array 4 based on the video signal Vs supplied from the outside, the controller 1 controls both of the signal line driver 2 and the scanning line driver 3 synchronously with the vertical clock VCK, the vertical synchronous signal Vsy, and the horizontal synchronous signal Hsy. Thus, the controller 1 carries out the control such that both of the signal line driver 2 and the scanning line driver 3 are operated synchronously with each other.

For example, the controller 1 generates a vertical start pulse VST regulating one frame period of time by, for example, using the vertical synchronous signal Vsy and the vertical clock VCK. Also, the controller 1 supplies the vertical start pulse VCK thus generated to each of the signal line driver 2 and the scanning line driver 3.

In addition, the controller 1, for example, frequency-divides the vertical clock VCK to generate the polarity signal SP, and then supplies the polarity signal SP thus generated to the signal line driver 2.

The scanning line driver 3 outputs a scanning pulse to the scanning lines GL_1 to GL_N in accordance with both of the vertical start pulse VST and the vertical clock VCK.

The scanning line driver 3 is provided with a shift register for successively transferring the vertical start pulse VST at a timing of the vertical clock VCK. As a result, the scanning line driver 3 successively outputs an operation pulse to the scanning lines GL_1, GL_2, ... GL_N with the timing of the vertical start pulse VST as a starting point. As a result, in the pixel array 4, the pixels from the pixel 10 belonging to the first line to the pixels belonging to the N-th line become a selection state for write of the pixel signals in order every timing of the vertical clock VCK.

The signal line driver 2 carries out an operation for outputting the pixel signals in units of one line to the signal lines SL_1R to SL_MB every timing of the vertical clock VCK (every 1H period of time) with the vertical start pulse VST as a starting point with respect to the video signal Vs supplied thereto from the controller 1.

Here, in the case of this configuration, the selection switch portion 5 is provided.

The signal line driver 2 outputs a pixel signal which has been obtained through time-division multiplexing in increments of the color pixels to a multiplexing signal lines MSL (MSL_1 to MSL_M).

The selection switch portion 5 includes switches SWR, SWG, and SWB for selecting three signal lines SL for one multiplexing signal line MSL.

The switch SWR carries out disconnection/connection between the signal line SL_xR corresponding to the column of the R pixels 10R, and the multiplexing signal line MSL (x=1 to M).

The switch SWG carries out disconnection/connection between the signal line SL_xG corresponding to the column of the G pixels 10G, and the multiplexing signal line MSL.

Also, the switch SWB carries out disconnection/connection between the signal line SL_xB corresponding to the column of the B pixels 10B, and the multiplexing signal line MSL.

The switches SWR, SWG, and SWB are turned ON/OFF in accordance with switch control signals selR, selG, and selB supplied from the signal line driver 2, respectively.

The signal line driver 2 outputs the switch control signals selR, selG, and selB in accordance with a timing at which the multiplexed pixel signal is outputted to the multiplexing signal line MSL.

Figure 7:
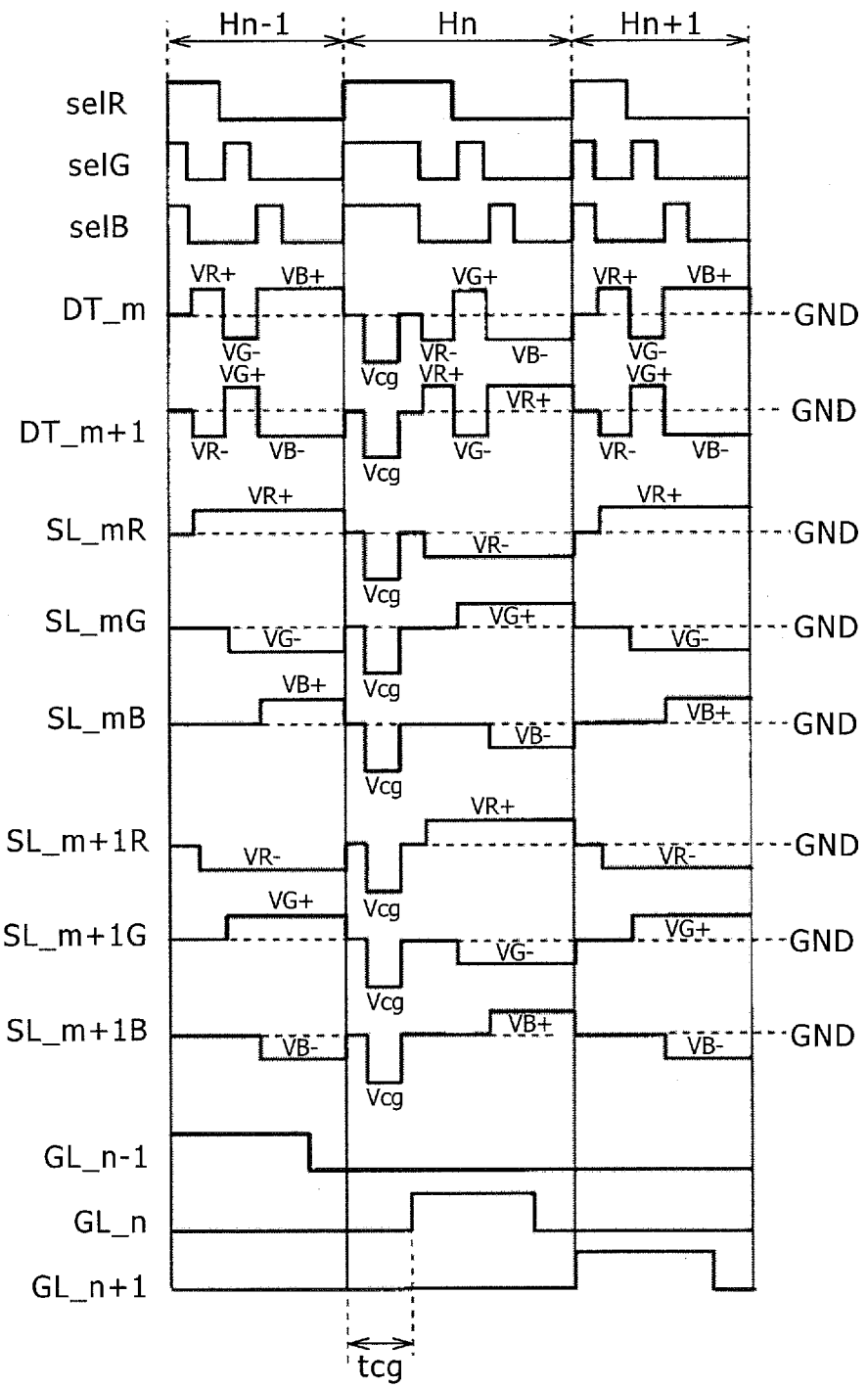
FIG. 7 is a waveform chart for display drive in each of the display devices according to the first and second embodiments of the present disclosure.
Figure 8:
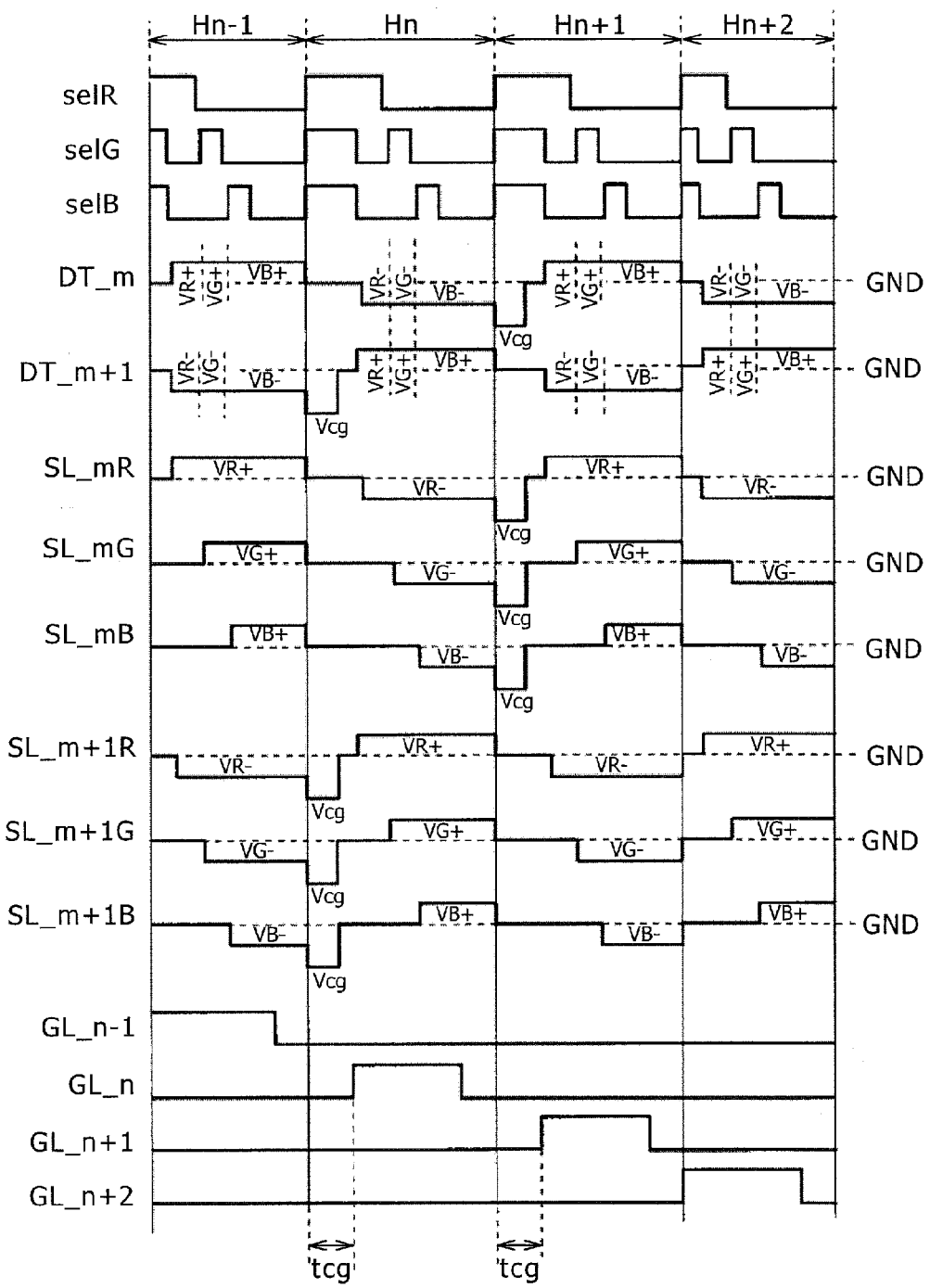
FIG. 8 is a waveform chart for display drive in each of the display devices according to the first and second embodiments of the present disclosure.

Although concrete examples of display drive waveforms will be shown with reference to FIGS. 7 and 8, the signal line driver 2 multiplexes a pixel signal VR for the R pixels 10R, a pixel signal VG for the G pixels 10G, and a pixel signal VB for the B pixels 10B in a time division manner, and outputs the resulting multiplexed signal to one multiplexing signal line MSL for 1H period of time. Along with this, the signal line driver 2 turns ON the switch SWR at an output timing of the pixel signal VR in accordance with the switch control signal selR, thereby supplying the pixel signal VR to the signal line SL_xR. Likewise, the signal line driver 2 turns ON the switches SWG and SWB at an output timing of the pixel signal VG, and at an output timing of the pixel signal VB in accordance with the switch control signals selG and selB, thereby supplying the pixel signals VG and VB to the signal lines SL_xG and SL_xB, respectively.

It is noted that for the purpose of carrying out a polarity inversion drive for the liquid crystal cell LC, the signal line driver 2 inverses the polarity of the pixel signal voltage which is outputted to the multiplexing signal line MSL in accordance with the polarity signal SP.

By carrying out the operations of the signal line driver 2 and scanning line drier 3 described above, the pixel signals are successively written to the pixels from the pixels 10 belonging to the first line to the pixels belonging to the N-th line for one frame period of time. As a result, the gradations (the light transmittances of the liquid crystal cells) of the pixels are individually set. As a result, the luminance of the light emitted from the backlight (not shown) is controlled in the pixels 10, and the color image display is further carried out through the color filters (not shown).

1-2. Intermittent Application of Charge Voltage for Solving Longitudinal Cross Talk For the purpose of improving the longitudinal cross talk due to the leakage current from the pixel transistor, in the first embodiment of the present disclosure, the signal line driver 2 carries out an operation for intermittently outputting a charge voltage with lower electric potential than a predetermined pixel signal voltage to the signal lines SL once or more for one frame period of time through the selection switch portion 5.

Although an aperture ratio of the pixel is reduced along with a present-day increasing of definition of the liquid crystal display device, for the purpose of maintaining a surface luminance, the luminance of the backlight tends to be increased.

Although when the luminance of the backlight is increased, the leakage current from the pixel transistor Tr is also increased, the longitudinal cross talk failure is caused when a certain leakage current is exceeded.

The longitudinal cross talk will now be described with reference to FIG. 2, and FIGS. 3A and 3B.

The longitudinal cross talk means a phenomenon in which when, for example, a white or black window is displayed on a gray background, a luminance of a vertical gray portion of the window is changed.

Figure 2:
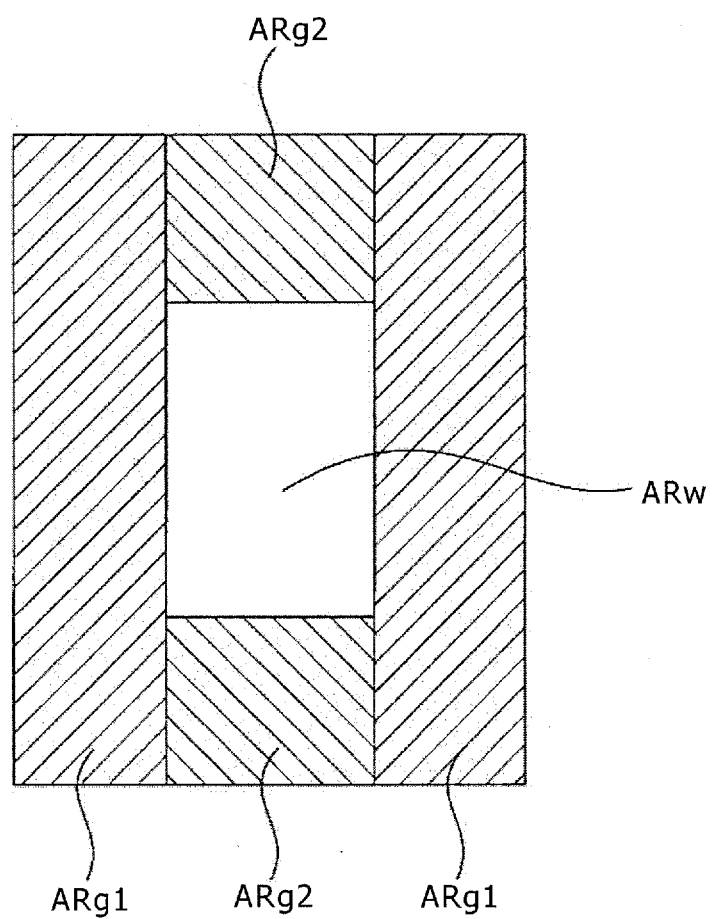
FIG. 2 is a diagram explaining a longitudinal cross talk.

FIG. 2 schematically shows a display state of a liquid crystal display device to which data on a white window pattern is inputted. Then, it is supposed that an area ARw is a display state of the white window pattern, and each of areas ARg1 and ARg2 is a display pattern of a gray raster pattern.

In the pixels 10 of the columns corresponding to the areas ARg1, the pixel signal voltage corresponding to the gray level is supplied to the signal lines SL of the columns concerned at timings of the respective lines.

On the other hand, the pixel signal voltage corresponding to a white level is supplied to the signal lines SL to which the pixels of the areas ARg2 located on both of an upper side and a lower side of the white window, respectively, at timings of the lines corresponding to the area ARw identified as the white window.

FIG. 3A shows a signal line voltage for one frame period of time.

In the window display column including the areas ARg2 and ARw, as shown in the figure, for the scanning period of time for the lines each becoming the window, the voltage of the signal line SL becomes either a positive-polarity voltage or a negative-polarity voltage corresponding to the white level (either white (+) or white (−)). On the other hand, for the scanning period of time for the lines corresponding to the areas ARg2, the voltage of the signal line SL becomes either a positive-polarity voltage or a negative-polarity voltage corresponding to the gray level (either gray (+) or gray (−)).

In each of the gray raster display columns corresponding to the areas ARg1, for one frame period of time, the voltage of the signal line SL becomes either a positive-polarity voltage or a negative-polarity voltage corresponding to the gray level (either gray (+) or gray (−)).

Owing to this influence, a difference in leakage current from the pixel is generated between the pixels in the areas ARg2 as the window display column, and the pixels in the areas ARg1 as the gray raster displaying columns. As a result, a luminance difference in gray display pixels is generated. In a word, the luminance difference is generated between the areas ARg1 and the areas ARg2 in which the same gray display is essentially carried out. This is visually recognized as the longitudinal cross talk.

The longitudinal cross talk will now be described in detail with reference to FIGS. 4A and 4B.

Figure 4A:
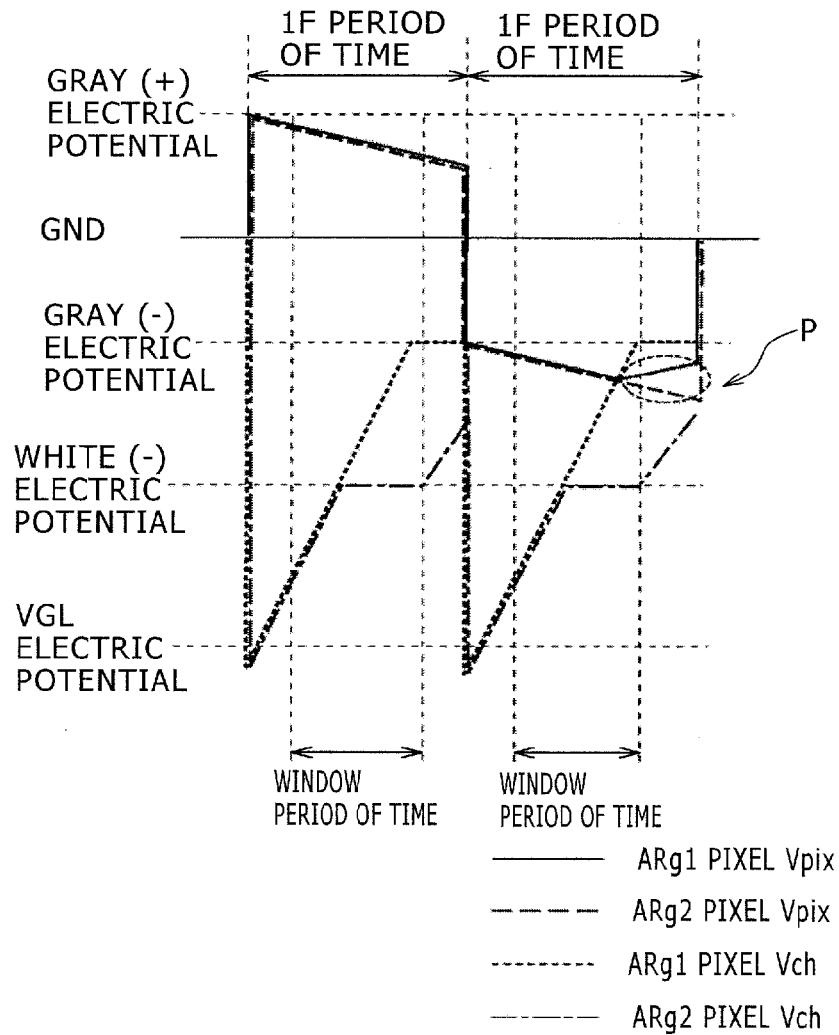
FIGS. 4A and 4B are respectively a waveform chart and an equivalent circuit diagram explaining the principles of generation of the longitudinal cross talk.

FIG. 4A shows pixel electric potential waveforms and a channel electric potential of the pixel transistor for a period of time for certain two frames.

Figure 4B:
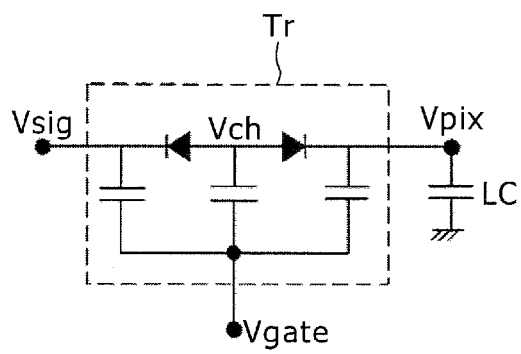

FIG. 4B is a circuit diagram in which with regard to the pixel transistor Tr and the liquid crystal cell LC of the pixels 10, the pixel transistor Tr is expressed as an equivalent circuit composed of a diode and a capacitor.

A pixel electric potential Vpix is defined as an electric potential based on the pixel signal voltage which is written to the liquid crystal cell LC. Also, the channel electric potential Vch is defined as a channel electric potential of the pixel transistor Tr. An electric potential Vgate is a gate electric potential of the pixel transistor Tr, and an electric potential Vsig is an electric potential of the signal line SL.

It is noted that although in this case, a single-gate is shown in the figure, the following circumstances also apply to a double-gate.

In FIG. 4A, a solid line indicates the pixel electric potential Vpix of each of the gray display pixels in the areas ARg1 (window non-display columns). Also, a broken line indicates the pixel electric potential Vpix of each of the gray display pixels in the areas ARg2 (window display column). In addition, a dotted line indicates the channel electric potential Vch of each of the gray display pixels in the areas ARg1, and an alternate long and short dashed line indicates the channel electric potential Vch of each of the gray display pixels in the areas ARg2.

Note that, FIG. 4A shows an example of the pixel in which for a left-side frame period of time, the positive-polarity pixel signal (the gray (+) electric potential) is applied, and for a right-side frame period of time, the negative-polarity pixel signal (the gray (−) electric potential) is applied.

An electric potential VGL means a gate electric potential when the pixel transistor Tr is held in the OFF state.

The leakage current from the pixel is firstly generated as a leakage current in a direction toward the channel electric potential Vch of the pixel transistor Tr.

Owing to that leakage current, as shown in FIG. 4A, after the pixel signal (either gray (+) or gray (−)) has been written, the pixel electric potential Vpix is going to drop. However, when the channel electric potential Vch and the pixel electric potential Vpix are reversed in level, the pixel electric potential Vpix is turned into the rise.

The channel electric potential Vch drops to the vicinity of the electric potential VGL at the head of one frame period of time, and then rises owing to the leakage current.

Here, in the pixels of the areas ARg2 as the window display column, the white level electric potential is applied to the signal line SL for the window display period of time. As a result, as shown in FIG. 4A, the channel electric potential Vch (indicated by an alternate long and short dashed line) is clipped at the white (+) electric potential.

On the other hand, in the pixels in the areas ARg1 as the window non-display columns, the gray electric potential is continuously applied to the signal line SL. For this reason, the channel electric potential Vch (indicated by a dotted line) is not clipped at the white (−) electric potential, but continues to rise until the gray (−) electric potential is reached.

Here, when attention is paid to the right-side frame period of time of FIG. 4A in which the pixel signal voltage becomes the negative polarity, in each of the pixels in the areas ARg1, the channel electric potential Vch (indicated by a dotted line) becomes higher than the pixel electric potential Vpix (indicated by a solid line) at a certain time point. For this reason, the direction of the leakage current is reversed, and as shown as a portion P surrounded by a dotted line, the pixel electric potential Vpix is turned into the rise.

However, at this time, in each of the pixels in the areas ARg2 as the window display column, similarly to the case of the positive-polarity drive frame, the channel electric potential Vch (indicated by an alternate long and short dashed line) is clipped at the write (−) electric potential for the window display period of time. As a result, the timing at which the pixel electric potential Vpix and the channel electric potential Vch are reversed is shifted backward. For example, no reverse is generated.

Since the channel electric potential Vch (indicated by an alternate long and short dashed line) does not become higher than the pixel electric potential Vpix (indicated by a broken line), even in the portion P, the tendency to reduce the pixel electric potential Vpix is not changed.

As a result, the diremption is generated in the pixel electric potential waveforms at and after the electric potential reverse point of the gray raster display column.

In such a portion P, the difference in pixel electric potential Vpix between each of the pixels in the areas ARg1, and each of the pixels in the areas ARg2 becomes the luminance difference between each of the pixels in the areas ARg1, and each of the pixels in the areas ARg2. This is visually recognized as the longitudinal cross talk.

For the purpose of improving such a longitudinal cross talk, in the first embodiment of the present disclosure, as shown in FIG. 3B, the display drive is carried out.

That is to say, as shown in FIG. 3B, the low charge voltage Vcg (the voltage of the low voltage of the dynamic range to about VGL) is written to the signal lines SL once or more for one frame period of time independently of the displayed image. As a result, the difference in pixel electric potential leakage waveform between the window display column and the window non-display column is reduced, thereby suppressing the longitudinal cross talk.

For example, the charge voltage of the low electric potential such as (the VGL electric potential+1V) is applied once during 100H (H: horizontal period of time), and so forth.

Figure 5A:
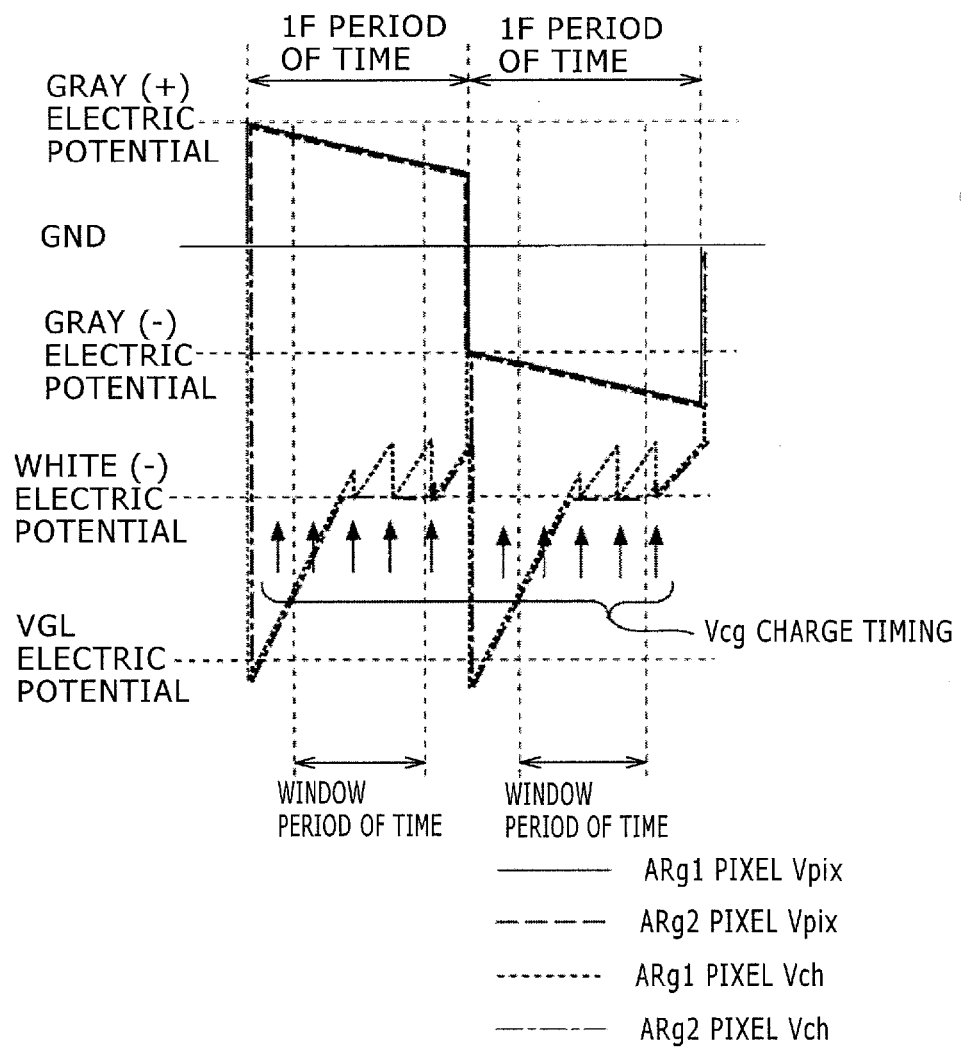
FIGS. 5A and 5B are respectively a waveform chart and an equivalent circuit diagram explaining a charge voltage application timing in the display device according to the first embodiment of the present disclosure.

Application of a charge voltage in the liquid crystal display device according to the first embodiment of the present disclosure will now be described with reference to FIGS. 5A and 5B. FIG. 5A shows the pixel electric potential Vpix (indicated by a solid line) and the channel electric potential Vch (indicated by a dotted line) of each of the gray display pixels in the areas ARg1 (as the window non-display columns), and the pixel electric potential Vpix (indicated by a broken line) and the channel electric potential Vch (indicated by an alternate long and short dashed line) of each of the gray display pixels in the areas ARg2 (as the window display column) similarly to the case of FIG. 4A described above.

Figure 5B:
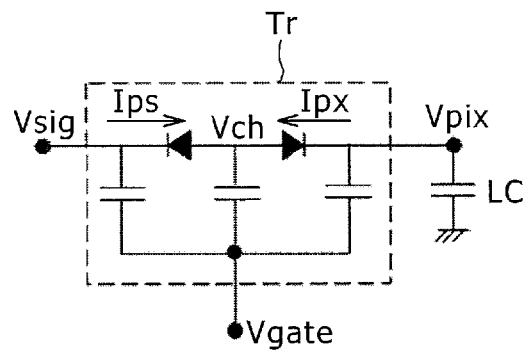

In addition, FIG. 5B shows a circuit diagram in which the liquid crystal cell LC and the pixel transistor Tr are expressed as an equivalent circuit similarly to the case of FIG. 4B.

The signal line driver 2 intermittently applies the charge voltage Vcg to each of the signal lines SL by the required number of times for one frame period of time at timings each indicated by an arrow.

In this case, it is supposed that a relationship of the charge voltage Vcg=the write (−) electric potential holds.

Even in any of the gray display pixels in the areas ARg1 and ARg2, due to the leakage current in the direction toward the channel electric potential Vch of the pixel transistor Tr, as shown in FIG. 5A, the pixel electric potential Vpix is going to drop.

With regard to the channel electric potential Vch, when a relationship of Vsig>Vch holds in a relationship to the signal line electric potential Vsig, a diode shown in the equivalent circuit shown in FIG. 5B is turned ON and a relationship of Vch=Vsig holds immediately.

Firstly, looking at the channel electric potential Vch of each of the gray display pixels in the areas ARg2 (as the window display column), the channel electric potential Vch rises from the vicinity of the electric potential VGL due to the leakage current, and is clipped at the white (−) electric potential for the window period of time.

Since a relationship of the charge voltage Vcg=the white (−) electric potential is set, for a period of time other than the window period of time, only at the charge voltage application timing when the channel electric potential Vch exceeds the white (−) electric potential, a relationship of the channel electric potential Vch=the charge voltage Vcg (=the white (−) electric potential) holds.

Next, looking at the channel electric potential Vch of each of the gray display pixels in the areas ARg1 (as the window non-display columns), the channel electric potential Vch is going to rise from the vicinity of the electric potential VGL due to the leakage current. However, when the channel electric potential Vch is held higher than the signal line electric potential Vsig, the channel electric potential Vch is refreshed to the channel electric potential Vch=the charge voltage Vcg (=white (−) electric potential) at the charge voltage application timing.

As a result, even in each of the gray display pixels in any of the areas ARg1 and ARg2, the channel electric potential Vch is refreshed to the charge voltage Vch=Vcg=white (−) electric potential at the charge voltage application timing. In a word, even in each of the gray display pixels in any of the areas ARg1 and ARg2, the channel electric potential Vch rises in the same way with the charge timing as a reference.

For this reason, since as shown in FIG. 5A, the reverse between the pixel electric potential Vpix and the channel electric potential Vch is not generated, and thus the diremption of the pixel waveform as shown as the portion P in FIG. 4A is not generated, the longitudinal cross talk does not appear.

Note that, the relationship of the charge voltage Vcg=the white (−) electric potential is set in this case. However, from a viewpoint of the operation principles described above, it is understood that all it takes is that the charge voltage Vcg is equal to or lower than the gray (−) electric potential (equal to or lower than the pixel electric potential Vpix due to the negative-polarity pixel signal). The reason for this is because the fact that the charge voltage Vcg is equal to or lower than the pixel electric potential Vpix leads to that the rise of the pixel electric potential Vpix and the rise of the channel electric potential Vch simultaneously proceed from the same charge electric potential with the charge timing as a start point, whereby it is possible to prevent the reverse between the pixel electric potential Vpix and the channel electric potential Vch from being generated.

However, although a description relating thereto will be given later in a second embodiment of the present disclosure, the charge voltage Vcg is as preferably as possible set to a low electric potential.

A description will now be given with respect to a timing at which the charge voltage Vcg is applied for one frame period of time.

For preventing the longitudinal cross talk from being generated, it can be said that it is only necessary to frequently apply the charge voltage. For example, most simply, it is only necessary to apply the charge voltage every 1H.

However, it is not preferable from a viewpoint of the power consumption to frequently apply the charge voltage Vcg to the signal line SL in such a manner.

In order to cope with such a situation, in the first embodiment of the present disclosure, as shown in FIG. 5A, the charge voltage is intermittently applied to the signal line SL within one frame period of time, whereby the improvement in the longitudinal cross talk is realized while the power consumption is reduced.

That is to say, the application of the charge voltage Vcg is not carried out every line, but is carried out about several times to about ten and several times for one frame period of time, which is effective in the reduction of the power consumption.

Let us consider that when the charge voltage is intermittently applied in such a manner, at what intervals the charge voltage is applied to make it possible to suitably improve the longitudinal cross talk.

From the above, it is understood that it is only necessary that for the improvement in the longitudinal cross talk, the charge voltage Vcg is applied to each of the signal lines SL at the frequency such that the channel electric potential Vch of the pixel transistor Tr is prevented from becoming higher than the pixel signal electric potential Vpix which is written to the pixel capacitor due to the leakage current.

In order to attain this, it is only necessary that a time interval Tcg at which the signal line driver 2 outputs the charge voltage Vcg to each of the signal lines SL fulfills Expression (1):

$$Tcg \le Cch \times (VgL - Vcg)/(Ipx + Ips) \quad (1)$$

where Cch is a capacitance of a channel portion of the pixel transistor Tr, VgL is a predetermined pixel signal voltage in which the cross talk becomes a problem, and is concretely the gray (−) electric potential from a viewpoint of the case of FIG. 5A, Ipx, as shown in FIG. 5B, is a pixel transistor leakage current caused to flow from the pixel capacitor (the liquid crystal cell LC) side to the channel portion of the pixel transistor Tr, and Ips is a pixel transistor leakage current caused to flow from the signal line SL side to the channel portion.

"Cch×(VgL−Vcg)" in Expression (1) represents an amount of electric charges until the channel electric potential Vch reaches the pixel electric potential Vpix through the charge voltage Vcg level because VgL corresponds to the pixel electric potential Vpix due to the application of the gray (−) electric potential. Also, "(Ipx+Ips)" represents a sum of leakage currents caused to flow into the channel. Therefore, the time interval Tcg fulfilling Expression (1) becomes a time interval as a frequency at which the channel electric potential Vch of the pixel transistor Tr is prevented from becoming higher than the pixel signal electric potential Vpix which is written to the pixel capacitor due to the leakage current.

The charge voltage Vcg is applied at the time interval Tcg fulfilling this condition, whereby the channel electric potential Vch of the pixel transistor Tr can be refreshed to the charge voltage Vcg before the channel electric Vch of the pixel transistor Tr becomes higher than the pixel electric potential Vpix.

Therefore, it is only necessary that the application of the charge voltage is carried out at the time interval fulfilling the condition of Expression (1). Actually, the time interval Tcg is also changed mainly from a relationship between the setting of the charge voltage Vcg, and the predetermined pixel signal voltage in which the cross talk becomes the problem. However, it is only necessary to set the charging time within one frame period of time so as to fulfill that condition.

2. Second Embodiment (Display Device)

Figure 6A:
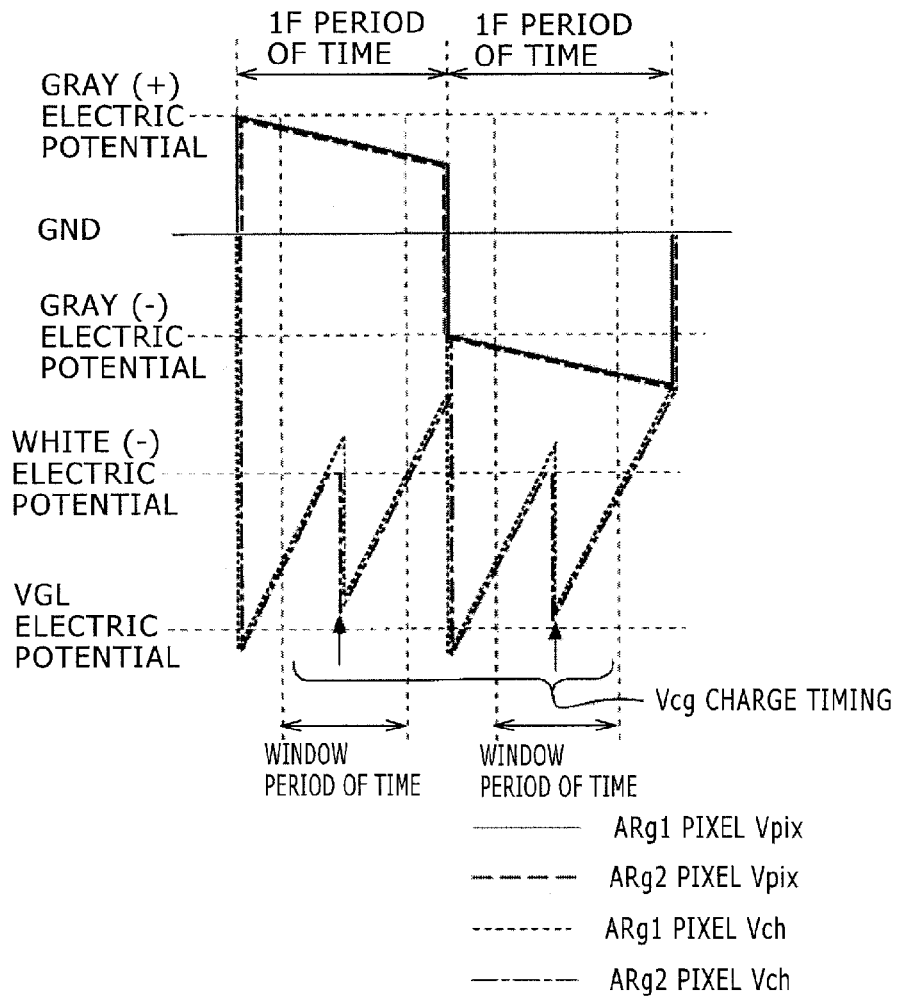
FIGS. 6A and 6B are respectively a waveform chart and an equivalent circuit diagram explaining a charge voltage application timing in a display device according to a second embodiment of the present disclosure.

A liquid crystal display device according to a second embodiment will now be described with reference to FIGS. 6A and 6B. FIG. 6A shows the pixel electric potential Vpix (indicated by a solid line) and the channel electric potential Vch (indicated by a dotted line) of each of the gray display pixels in the areas ARg1 (as the window non-display columns), and the pixel electric potential Vpix (indicated by a broken line) and the channel electric potential Vch (indicated by an alternate long and short dashed line) of each of the gray display pixels in the areas ARg2 (as the window display column) similarly to the case of FIG. 4A described above.

Figure 6B:
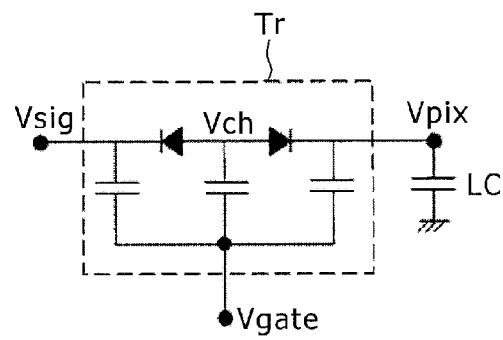

In addition, FIG. 6B shows a circuit diagram in which the liquid crystal cell LC and the pixel transistor Tr are expressed as an equivalent circuit similarly to the case of FIG. 4B.

The signal line driver 2 applies the charge voltage Vcg to each of the signal lines SL by a necessary number of times for one frame period of time (for example, once within one frame in this case shown in FIG. 6A) at timings each indicated by an arrow.

In this case, it is supposed that a relationship of the charge voltage Vcg=the electric potential VGL+α holds. For example, (the electric potential VGL+1V) is supposed.

As shown in FIG. 6A, even in any of the gray display pixels in the areas ARg1 and ARg2, due to the leakage current in the direction toward the channel electric potential Vch of the pixel transistor Tr, the pixel electric potential Vpix is going to drop.

Looking at the channel electric potential Vch of each of the gray display pixels in the areas ARg2 (as the window display column), the channel electric potential Vch is going to rise from the vicinity of the electric potential VGL due to the leakage current, and is clipped at the white (−) electric potential for the window period of time.

In addition, in each of the gray display pixels in any of the areas ARg1 (as the window non-display columns) and the areas ARg2 (as the window display column), the channel electric potential Vch is refreshed to the channel electric potential Vch=(the electric potential VGL+α) at each of the charge voltage application timings.

As a result, even in each of the gray display pixels in any of the areas ARg1 and ARg2, the channel electric potential Vch is going to rise in the same way with the charge timing as a reference.

For this reason, since as shown in FIG. 6A, the reverse between the pixel electric potential Vpix and the channel electric potential Vch is not generated, and thus the diremption of the pixel waveform as shown as the portion P in FIG. 4A is not generated, the longitudinal cross talk does not appear.

As described above, it is only necessary that as far as the time interval Tcg of the application of the charge voltage, the channel electric potential Vch can be refreshed to the charge voltage Vcg before the charge electric potential Vch of the pixel transistor Tr becomes higher than the pixel electric potential Vpix.

When the charge voltage Vcg is set low, the time interval Tcg can be lengthened all the more. In a word, the number of times of the charge which is carried out within one frame period of time can be reduced as the charge voltage Vcg is lower.

The number of times of the charge is less, which is effective in reduction of the power consumption all the more.

As shown in FIG. 6A, the charge voltage Vcg is set as low as possible, and the number of times of the charge within the one frame period of time is reduced, whereby factually, the longitudinal cross talk can be improved with the power consumption at the level almost compatible to that of the power consumption when no charge is carried out.

In this sense, the charge voltage Vcg is preferably set to a voltage having the range of being equal to or smaller than the negative-polarity electric potential corresponding to the drive maximum gradation (equal to or smaller than the white (−) electrode potential in the case of FIG. 6A) of the pixel signal, and being equal to or larger than the electric potential VGL as the gate electric potential when the pixel transistor Tr is held in the OFF state so as to fall within the range in which the leakage current due to the insufficiency in the difference in voltage between the gate electrode and the signal line is not generated.

3. Concrete Examples of First and Second Embodiments (Display Device)

A description will now be given with respect to concrete operation waveforms in the liquid crystal display devices of the first and second embodiments described above.

Firstly, FIG. 7 shows an operation waveform in the case where the pixel signals is driven with the polarity being inverted every sub-pixel.

In the case shown in FIG. 7, an Hn−1 period of time, an Hn period of time, and an Hn+1 period of time are exemplified as certain three horizontal periods of time within one frame ("n" is any one of "1" to "N−1" where N is a row number).

The signal line driver 2 supplies the switch control signals selR, selG, and selB to the selection switch portion 5, thereby carrying out ON/OFF control for the switches SWR, SWG, and SWB.

In addition, the signal line driver 2 outputs multiplexed pixel signals DT_m and DT_m+1 (m is any one of "1" to "M−1" where M is a column number) to multiplexing signal lines MSL_m and MSL_m+1, respectively, for each of H periods of time as shown in FIG. 7.

Firstly, a description will now be given with respect to waveforms in the Hn−1 period of time.

For example, in the Hn−1 period of time, the signal line driver 2 outputs the multiplexed pixel signal DT_m to the multiplexing signal line MSL_m. In this case, the ground electric potential GND, the positive-polarity R pixel signal VR+, the negative-polarity G pixel signal VG−, and a positive-polarity B pixel signal VB+ are multiplexed in the time division manner into the multiplexed pixel signal DT_m.

In addition, in the Hn−1 period of time, the signal line driver 2 outputs the multiplexed pixel signal DT_m+1 to the multiplexing signal line MSL_m+1. In this case, the ground electric potential GND, a negative-polarity R pixel signal VR−, a positive-polarity G pixel signal VG+, and a negative-polarity B pixel signal VB− are multiplexed in the time division manner into the multiplexed pixel signal DT_m+1.

In the Hn−1 period of time, the switches SWR, SWG, and SWB are turned ON for a period of time of an H level of the switch control signals selR, selG, and selB, whereby as shown in FIG. 7, the R pixel signal VR+, the G pixel signal VG−, and the B pixel signal VB+ are supplied to the signal lines SL_mR, SL_mG, and SL_mB, respectively.

In addition, as shown in FIG. 7, the R pixel signal VR−, the G pixel signal VG+, and the B pixel signal VB− are supplied to the signal lines SL_m+1R, SL_m+1G, and SL_m+1B, respectively.

The scanning line driver 3 supplies the scanning pulse becoming the H level pulse to the scanning line GL_n−1 for the Hn−1 period of time.

As a result, the R pixel signal VR+, the G pixel signal VG−, and the B pixel signal VB+ which have been applied to the signal lines SL_mR, SL_mG, and SL_mB, respectively, are written to the pixels 10R, 10G, and 10B which belong to the scanning line GL_n−1 and to which the signal lines SL_mR, SL_mG, and SL_mB are connected, respectively.

In addition, the R pixel signal VR−, the G pixel signal VG+, and the B pixel signal VB− which have been applied to the signal lines SL_m+1R, SL_m+1G, and SL_m+1B, respectively, are written to the pixels 10R, 10G, and 10B which belong to the scanning line GL_n−1 and to which the signal lines SL_m+1R, SL_m+1G, and SL_m+1B are connected, respectively.

In each of the Hn period of time and the Hn+1 period of time as well, the basic operation for writing the pixel signal is the same as that described above.

For example, in the Hn period of time, the scanning line driver 3 supplies the scanning pulse becoming the H level pulse to the scanning line GL_n. As a result, the R pixel signal VR−, the G pixel signal VG+, and the B pixel signal VB− which have been applied to the signal lines SL_mR, SL_mG, and SL_mB, respectively, are written to the pixels 10R, 10G, and 10B which belong to the scanning line GL_n and to which the signal lines SL_mR, SL_mG, an SL_mB are connected, respectively.

In addition, the R pixel signal VR+, the G pixel signal VG−, and the B pixel signal VB+ which have been applied to the signal lines SL_m+1R, SL_m+1G, and SL_m+1B, respectively, are written to the pixels 10R, 10G, and 10B which belong to the scanning line GL_n and to which the signal lines SL_m+1R, SL_m+1G, and SL_m+1B are connected, respectively.

However, in the case of FIG. 7, in the Hn period of time, the application of the charge voltage Vcg is carried out.

For this reason, in the Hn period of time, the signal line driver 2 firstly controls all of the switches SWR, SWG, and SWB of the selection switch portion 5 so that all of the switches SWR, SWG, and SWB are turned ON in accordance with the switch control signals selR, selG, and selB, respectively.

Also, in the period of time for which all of the switches SWR, SWG, and SWB are turned ON, the charge voltage Vcg are multiplexed as shown as the multiplexed pixel signals DT_m and DT_m+1.

Although in this case, only the m-th column and the (m+1)-th column are shown, the signal line driver 2 multiplexes the charge voltages Vcg into the multiplexed pixel signals DT_1 to DT_M corresponding to all of the multiplexing signal lines MSL_1 to MSL_M, respectively.

By carrying out this operation, the charge voltage Vcg is inputted to all of the signal lines SL.

It is noted that the charge voltage Vcg which is supplied to the signal line SL in such a manner needs not to be written to the pixel 10. For this reason, the scanning line driver 3 delays the timing of the scanning pulse which is given to the scanning line GL_n for the Hn period of time by a time for a charge period of time tcg.

That is to say, the scanning line driver 3 delays the scanning pulse output timing only for the H period of time, such as the Hn period of time, for which the charge voltage Vcg is applied within one frame period of time.

As shown in FIG. 7, it is only necessary that the application of the charge voltage Vcg is carried out in a certain H period of time within one frame.

How many number of times, the application of the charge voltage is carried out within one frame have only necessary to be set so as to fulfill the condition of the time intervals Tcg described above.

FIG. 8 shows operation waveforms in the case where the polarity of each of the pixel signals which are supplied to the sub-pixels, respectively, for 1H period of time is not inversed.

In this case, in the Hn−1 period of time, the Hn period of time, the Hn+1 period of time and the Hn+2 period of time are exemplified as the four horizontal periods of time within one frame.

The signal line driver 2 supplies the switch control signals selR, selG, and selB to the selection switch portion 5, so that the switches SWR, SWG, and SWB are controlled so as to be turned ON or OFF.

In addition, the signal line driver 2 outputs the multiplexed pixel signal DT_m and DT_m+1 to the multiplexing signal lines MSL_m and MSL_m+1 in each of the H periods of time as shown in FIG. 8.

Since the operation for writing the pixel signal to the pixel 10 is the same as that shown in FIG. 7, a description thereof is omitted here.

In this case, in each of the 1H periods of time, the signal line driver 2 outputs either the multiplexed pixel signal DT_m into which the ground electric potential GND, the positive-polarity R pixel signal VR+, the positive-polarity G pixel signal VG+, and the positive-polarity B pixel signal VB+ are multiplexed in the time division manner, or the multiplexed pixel signal DT_m+1 into which the ground electric potential GND, the negative-polarity R pixel signal VR−, the negative-polarity G pixel signal VG−, and the negative-polarity B pixel signal VB− are multiplexed in the time division manner.

In the Hn−1 period of time, no charge voltage Vcg is applied.

In the Hn period of time, the charge voltage Vcg is applied to each of the signal lines SL_m+1R, SL_m+1G, and SL_m+1B.

That is to say, in the Hn period of time, the signal line driver 2 firstly controls all of the switches SWR, SWG, and SWB of the selection switch portion 5 so that all of the switches SWR, SWG, and SWB are turned ON in accordance with the switch control signals selR, selG, and selB, respectively.

Also, the charge voltages Vcg are multiplexed as shown as the multiplexed pixel signal DT_m+1.

It is noted that the multiplexed pixel signal DT_m is set to the ground electric potential for this period of time.

By carrying out this operation, the charge voltage Vcg is applied to each of the signal lines SL_m+1R, SL_m+1G, and SL_m+1B.

For example, when it is supposed that an even-numbered column in units of the color pixels composed of three sub-pixels corresponds to the signal lines SL_m+1R, SL_m+1G, and SL_m+1B, and an odd-numbered column in units of the color pixels corresponds to the signal lines SL_mR, SL_mG, and SL_mB, the charge voltage is applied to each of the signal lines SL corresponding to the even-numbered column stated herein.

On the other hand, in the Hn+1 period of time, the charge voltage Vcg is applied to each of the signal lines SL_mR, SL_mG, and SL_mB.

That is to say, in the Hn+1 period of time, the signal line driver 2 firstly controls all of the switches SWR, SWG, and SWB of the selection switch portion 5 so that all of the switches SWR, SWG, and SWB are turned ON in accordance with the switch control signals selR, selG, and selB, respectively.

Also, the charge voltages Vcg are multiplexed as shown as the multiplexed pixel signal DT_m.

It is noted that the multiplexed pixel signal DT_m+1 is set to the ground electric potential for this period of time.

By carrying out this operation, the charge voltage Vcg is applied to each of the signal lines SL_mR, SL_mG, and SL_mB.

For example, the charge voltage is applied to each of the signal lines SL, corresponding to the odd-numbered column, of the all of the signal lines SL.

It is noted that in each of the Hn period of time and Hn+1 period of time, the scanning line driver 3 delays the timing at which the scanning pulse is supplied to each of the scanning lines GL_n and GL_n+1 by the time for the charge period of time tcg.

The case shown in FIG. 8 is such that the charge voltage is applied to the column after the negative-polarity pixel signals have been written.

For example, looking at the signal lines SL_mR, SL_mG, and SL_mB, the charge voltage Vcg is applied at the timing after the pixel signals VR−, VG−, and VB− have been set.

This also applies to each of the signal lines SL_m+1R, SL_m+1G, and SL_m+1B, the charge voltage Vcg is applied at the timing after the pixel signals VR−, VG−, and VB− have been set.

By carrying out such an operation, it is possible to omit the operation for temporarily withdrawing the signal lines S to the ground electric potential GND as the measures taken to cope with the exceeding of the withstand voltages of the output circuit of the signal line driver 2, and the selection switch portion 5 before the charge voltage Vcg as the low voltage is applied.

As a result, it is possible to promote the reduced power consumption.

4. Third Embodiment (Display Device)

Subsequently, a description will be given with respect to a liquid crystal display device according to a third embodiment of the present disclosure.

The third embodiment is such that in a drive system in which when the liquid crystal display device has a touch panel structure, the write scanning for the write of the pixel signals by the scanning line driver, and the detection scanning for the detection of the touch manipulation are carried out plural times in the time division manner for one frame period of time, the output of the charge voltage Vcg by the signal line driver 2 is carried out in a boundary in period of time between the detection scanning and the write scanning.

Figure 9:
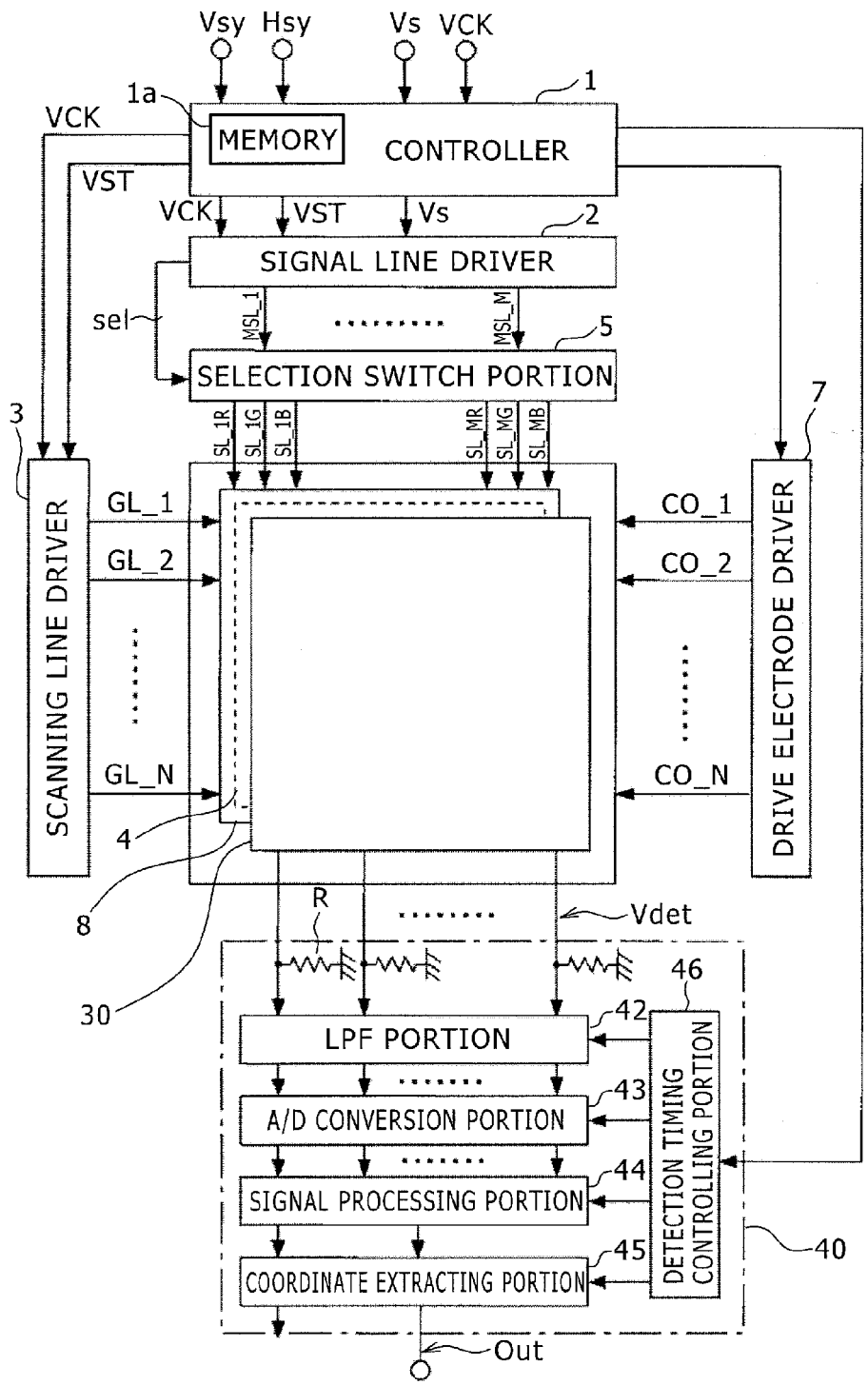
FIG. 9 is a block diagram, partly in circuit, showing a configuration of a display device according to a third embodiment of the present disclosure.

FIG. 9 is a block diagram, partly in circuit, showing a configuration of a liquid crystal display device, including a touch panel function, according to the third embodiment of the present disclosure. The liquid crystal display device including a touch panel function is a so-called in-cell type display device in which a liquid crystal display panel and an electrostatic capacitance type touch panel are integrated with each other.

As far as a configuration for the image display, similarly to the case of FIG. 1, the liquid crystal display device includes the controller 1, the signal line driver 2, the scanning line driver 3, the selection switch portion 5, and the display panel 8.

The display panel 8 is shown as a portion in which similarly to the case of the liquid crystal display device of the first embodiment shown in FIG. 1, the pixel array 4 is formed, and the liquid crystal pixels (the pixels 10) are disposed in a matrix, thereby carrying out the display operation.

In addition, the configuration of the multiplexing signal lines MSL (MSL_1 to MSL_M) extending from the signal line driver 2 to the selection switch portion 5, the configuration for the supply of the switch control signals sel (selR, selG, and selB), and the configuration of the switches SWR, SWG, and SWB in the selection switch portion 5, the signal lines SL (SL_1R to SL_MB), and the scanning lines GL (GL_1 to GL_N) are the same as those of the liquid crystal display device of the first embodiment shown in FIG. 1.

The liquid crystal display device of the third embodiment includes a touch panel portion 30, a touch detecting portion 40, and a drive electrode driver 7 in addition to these constituent elements.

The controller 1 supplies control signals to the scanning line driver 3, the signal line driver 2, the drive electrode driver 7, and the touch detecting portion 40, correspondingly, based on a video signal Vs supplied thereto from an external host apparatus or the like. Thus, the controller 1 carries out the control such that the scanning line driver 3, the signal line driver 2, the drive electrode driver 7, and the touch detecting portion 40 are operated synchronously with one another.

In the figure, a memory 1a for temporarily storing therein the video signal Vs is shown in the controller 1. In this case, a storage capacity of the memory 1a is adapted to correspond to at least an amount of data which is 1/10 of the video information for one frame. For example, when a vertical display resolution is 1,280 pixels, the memory 1a stores therein the video signal Vs for 128 lines.

The memory 1a writes thereto the video signal Vs supplied thereto synchronously with a vertical synchronous signal Vsy and a horizontal synchronous signal Hsy which are supplied together with the video signal Vs from the external host apparatus or the like. Also, the memory 1a is adapted to read out therefrom the video information stored therein at a higher speed than that of the write synchronously with an internal clock of the liquid crystal display device concerned.

Specifically, the memory 1a writes thereto the data of 1/10 of the video signal Vs for one frame in order in increments of one horizontal line. After that, likewise, the memory 1a writes thereto the data of 1/10 of the video signal Vs for one frame in order in increments of one horizontal line while it overwrites the data on the last data of 1/10 of the video signal Vs for one frame. Also, the memory 1a reads out therefrom the data thus written thereto in order in increments of one horizontal line at a higher speed than that of the write before the last data is erased by overwriting the next data on the last data. Also, as will be described later, the display based on the data thus read out is carried out in the display panel portion 8 every partial display area RD which is obtained by equally dividing the display screen in the vertical direction into ten partial display areas RD.

The scanning line driver 3 successively outputs the scanning pulse to the scanning lines GL for the lines of the display panel portion 8 (the pixel array 4) in accordance with a vertical clock VCK and a vertical start pulse VST which are supplied thereto from the controller 1.

The signal line driver 2 carries out an operation for outputting the pixel signals to the signal lines SL through the selection switch portion 5 in accordance with the video signal Vs and the control signal which are supplied thereto from the controller 1.

These operations are basically the same as those in each of the first and second embodiments described above.

However, as will be described later with reference to FIGS. 13 and 14, in the third embodiment, a touch detection period of time Pt and a display period of time Pd are division-set within one frame. For the scanning by the scanning line driver 3, and the pixel signal output (and the charge voltage application) by the signal line driver 2, the timings thereof comes to be regulated in accordance with that the touch detection period of time Pt and the display period of time Pd are division-set within one frame.

The drive electrode driver 7 supplies a drive signal Vcom to each of drive electrodes CO (CO_1 to CO_N) in accordance with a control signal supplied thereto from the controller 1. Specifically, the drive electrode driver 7 applies a DC (direct current) drive signal VcomDC to each of the drive electrodes CO for the display period of time Pd which will be described later. Also, for the touch detection period of time Pt, the drive electrode driver 7 applies an AC (alternate current) drive signal VcomAC to the drive electrode(s) CO (each) becoming an object of the touch detecting operation, and applies the DC drive signal VcomDC to each of other drive electrodes CO.

In this case, the drive electrode driver 7 drives the drive electrodes CO every block (every partial detection area RT which will be described later) composed of a predetermined number of drive electrodes CO.

The touch panel portion 30 is disposed so as to be superposed on the display panel portion 8 having the display area in the form of the pixel array 4 and, for example, carries out the touch detection in an electrostatic capacitance style, thereby outputting a touch detection signal Vdet. The touch panel portion 30 is successively scanned in accordance with the AC drive signal VcomAC supplied thereto from the drive electrode driver 7, thereby carrying out the touch detection.

The touch detecting portion 40 detects whether or not the touch panel portion 30 is touched in accordance with the control signal supplied thereto from the controller 1, and the touch detection signal Vdet supplied thereto from the touch panel portion 30. As a result, the touch detecting portion 40 obtains the coordinates and the like in the touch detection area when the touch panel portion 30 is touched.

The touch detecting portion 40 includes a Low-Pass Filter (LPF) portion 42, an A/D conversion portion 43, a signal processing portion 44, a coordinate extracting portion 45, and a detection timing controlling portion 46.

The LPF 42 is a low-pass filter for removing away a high-frequency component(s) (noise component(s)) contained in the touch detection signal Vdet supplied thereto from the touch panel portion 30 to fetch out the touch components, thereby outputting the touch components. Resistors R for giving DC electric potentials (for example, 0 V) are connected between input terminals of the LPF portion 42, and the ground. The A/D conversion portion 43 samples analog signals outputted thereto from the LPF portion 42 at a timing synchronized with the AC drive signal VcomAC, thereby converting the analog signals thus sampled into digital signals. The signal processing portion 44 is a logic circuit for detecting whether or not the touch detection device 30 is touched in accordance with the output signals from the A/D conversion portion 43. The coordinate extracting portion 45 is a logic circuit for, when the touch detection is done in the signal processing portion 44, obtaining the touch panel coordinates for the touch. Also, the detection timing controlling portion 46 has a function of carrying out the control such that the LPF portion 42, the A/D conversion portion 43, the signal processing portion 44, and the coordinate extracting portion 45 are operated synchronously with one another.

Figure 10:
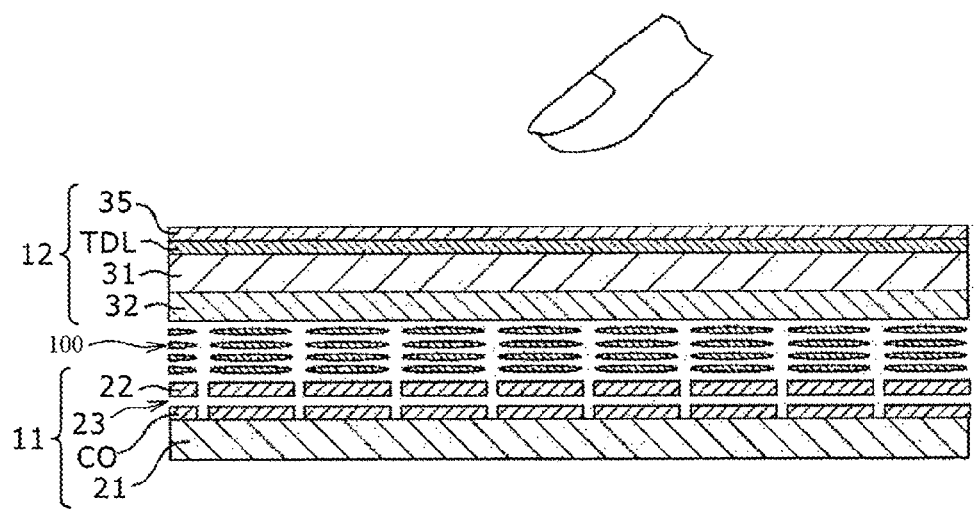
FIG. 10 is a cross sectional view showing a cross-sectional structure of the display device according to the third embodiment of the present disclosure.

FIG. 10 is a cross sectional view showing a cross-sectional structure of a main portion of the liquid crystal display device with the touch panel function according to the third embodiment of the present disclosure. The liquid crystal display device with the touch panel function includes a pixel substrate 11, a counter substrate 12 which is disposed so as to face the pixel substrate 11, and a liquid crystal layer 100 interposed between the pixel substrate 11 and the counter substrate 12.

The pixel substrate 11 includes a TFT substrate 21 as a circuit substrate, the drive electrodes CO, and pixel electrodes 22. The TFT substrate 21 functions as the circuit substrate on which various kinds of electrodes and wiring, Thin Film Transistors (TFTs), and the like are formed.

The TFT substrate 21, for example, is made of a glass. The drive electrodes CO are formed on the TFT substrate 21. The drive electrode CO is an electrode through which a common voltage is supplied to each of plural pixels 10. The drive electrode CO not only functions as a common drive electrode for a liquid crystal display operation, but also functions as a drive electrode for a touch detecting operation.

An insulating layer 23 is formed on the drive electrodes CO, and the pixel electrodes 22 are formed on the insulating layer 23. The pixel electrode 22 is an electrode through which the pixel signal is supplied, and thus has translucency. Each of the drive electrode CO and the pixel electrode 22, for example, is made of an Indium Tin Oxide (ITO).

The counter substrate 12 includes a glass substrate 31, a color filter 32, and touch detection electrodes TDL. The color filter 32 is formed on one surface of the glass substrate 31. The color filter 32, for example, is structured by periodically arranging color filters of the three primary colors: Red (R); Green (G); and Blue (B). Thus, the color filters of R, G, and B are provided so as to correspond to the pixels 10R, 10G, and 10B in the pixel array 4, respectively.

In addition, the touch detection electrodes TDL are formed on the other surface of the glass substrate 31. The touch detection electrode TDL is an electrode which, for example, is made of an ITO and has translucency. A polarizing plate 35 is disposed on the touch detection electrodes TDL.

The liquid crystal layer 100 functions as a display function layer and modulates a light through the liquid crystal layer 100 in accordance with a state of an electric field. The electric field is formed based on an electric potential difference between a voltage of the drive electrode CO, and a voltage of the pixel electrode 22. A liquid crystal having a transverse electric field mode such as Fringe Field Switching (FFS) or In-Plane Switching (IPS) is used in the liquid crystal layer 100.

Note that, an alignment film is disposed between the liquid crystal layer 100 and the pixel substrate 11, and between the liquid crystal layer 100 and the counter substrate 12. Also, an incidence side polarizing plate is disposed on a lower surface side of the pixel substrate 11. In this case, an illustration of the alignment film, and the incidence side polarizing plate is omitted here for the sake of simplicity.

Figure 11:
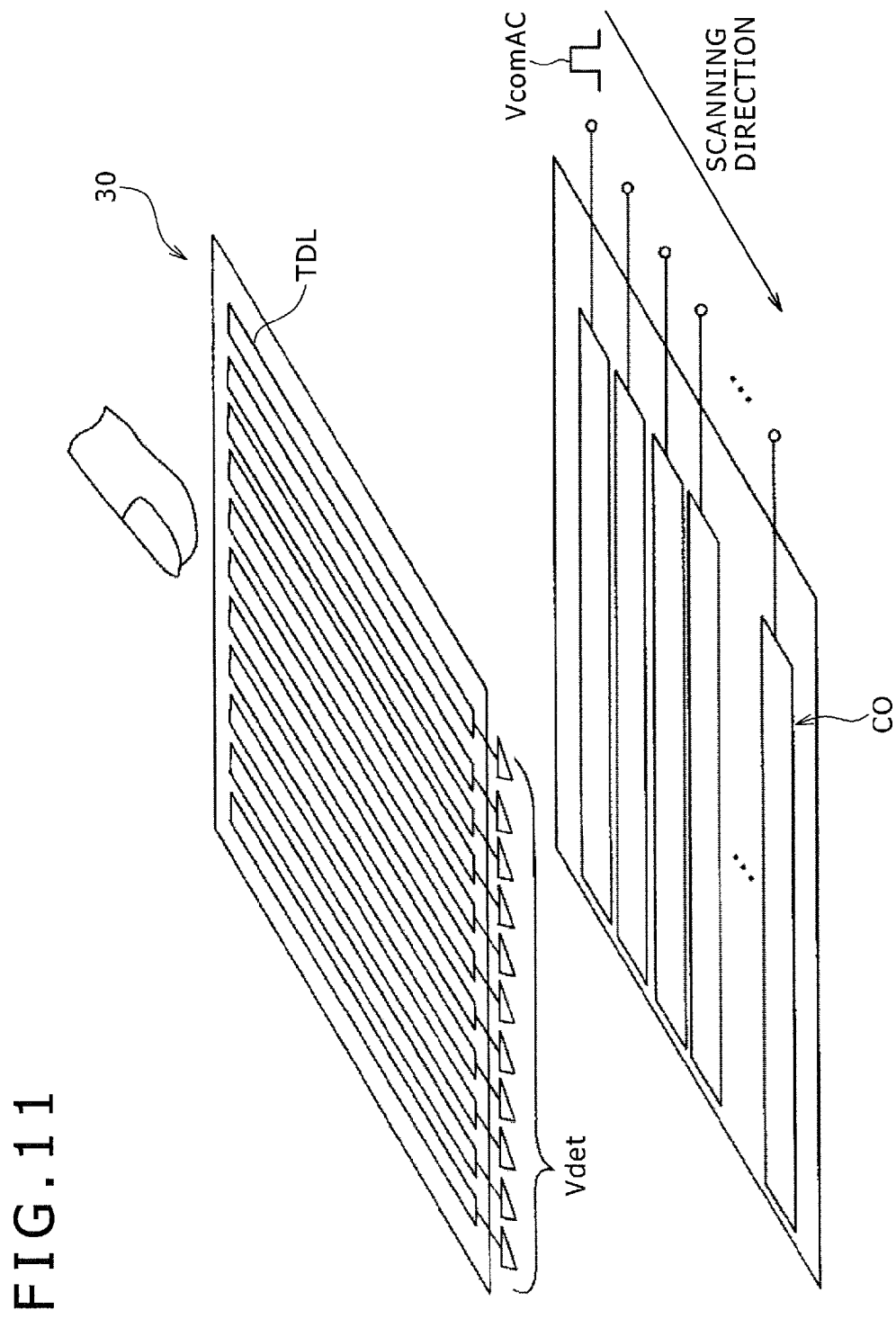
FIG. 11 is an explanatory view showing a structure of a touch panel mechanism in the display device according to the third embodiment of the present disclosure.

FIG. 11 is a perspective view showing a structure of the touch panel portion 30. The touch panel portion 30 is composed of the drive electrodes CO provided in the pixel substrate 11, and the touch detection electrodes TDL provided in the counter substrate 12.

The drive electrode CO has a stripe-like electrode pattern extending in a horizontal direction in the figure. When the touch detecting operation is carried out, the AC drive signal VcomAC is successively supplied to the electrode patterns every block (every partial detection area RT which will be described later) composed of a predetermined number of drive electrodes CO, and thus the scanning drive is carried out in the time division manner.

The touch detection electrode TDL has a stripe-like electrode pattern extending in a direction perpendicular to the extension direction of the electrode pattern of the drive electrode CO. The electrode patterns of the touch detection electrodes TDL are connected to inputs of LPF portion 42 of the touch detecting portion 40, correspondingly. In each of the electrode patterns in which the drive electrodes CO and the touch detection electrodes TDL intersect with each other, an electrostatic capacitor is formed in an intersection portion between them.

By adopting this structure, in the touch panel portion 30, the drive electrode driver 7 applies the AC drive signal VcomAC to each of the drive electrodes CO, whereby the touch detection signals Vdet are inputted from the touch detection electrodes TDL, thereby carrying out the touch detection.

As shown in the figure, the electrode patterns intersecting with each other structure an electrostatic capacitance type touch sensor in a matrix. Therefore, the scanning is carried out for the entire touch detection surface of the touch panel portion 30, whereby it becomes possible to detect either the contact of an external proximity object or the position where the proximity is caused.

Figure 12A:
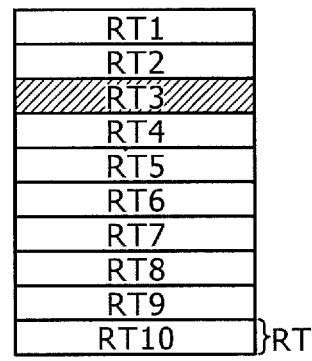
FIGS. 12A, 12B, and 12C are diagrams explaining partial detection areas in the display device according to the third embodiment of the present disclosure.
Figure 12B:
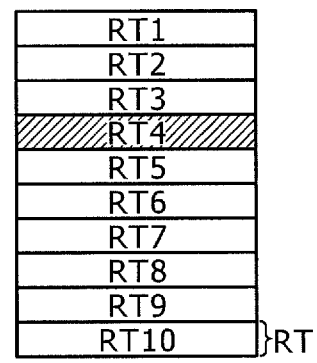
Figure 12C:
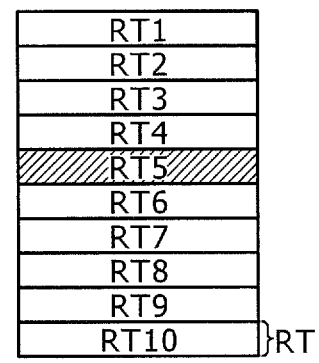

FIGS. 12A, 12B, and 12C are diagrams schematically representing touch detection scanning. Also, FIGS. 12A, 12B, and 12C show an operation for supplying the AC drive signal VcomAC to partial detection areas RT1 to RT10 when the touch detection surface is composed of the ten partial detection areas RT1 to RT10.

A size of each of the partial detection areas RT, for example, is set to a width (for example, about 5 mm) corresponding to a size of a finger of a user who carries out a manipulation. The drive electrode driver 7 applies the AC drive signal VcomAC to the drive electrodes CO every partial detection area RT. A slant line portion shows the partial detection area RT to which the AC drive signal VcomAC is applied, and the DC drive signal VcomDC is supplied to each of other partial detection areas RT.

As shown in FIGS. 12A, 12B, and 12C, the drive electrode driver 7 successively selects the partial detection area RT becoming an object of the touch detecting operation to apply the AC drive signal VcomAC to each of the drive electrodes CO belonging to the partial detection area RT concerned, thereby carrying out the scanning over all of the partial detection areas RT.

It is noted that although in this case, for the convenience of the description, the number of partial detection areas RT is set to ten, the present disclosure is by no means limited thereto.

Subsequently, a description will be given with respect to an operation of the liquid crystal display device according to the third embodiment of the present disclosure.

Figure 13:
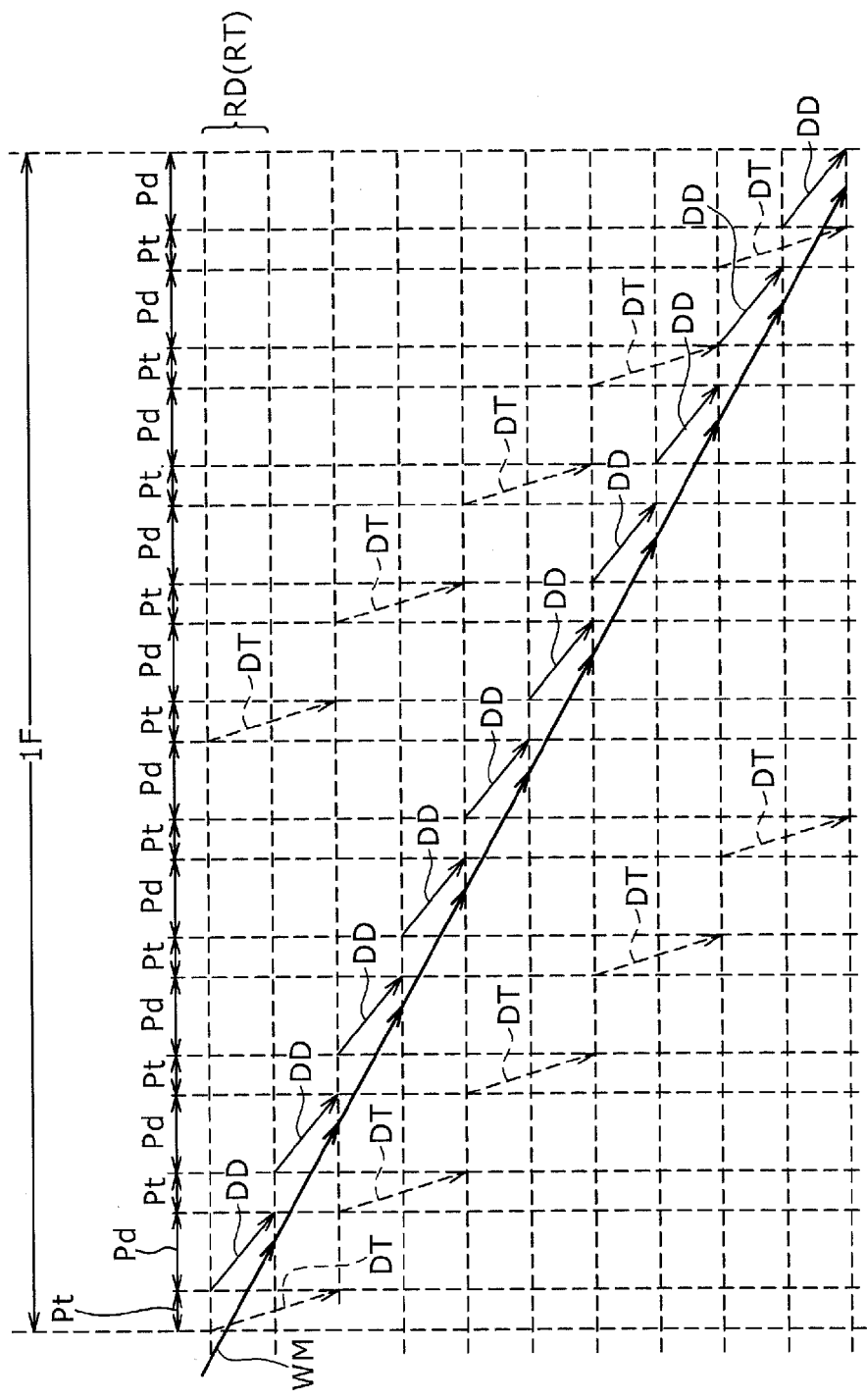
FIG. 13 is an explanatory diagram schematically showing a touch detection period of time and a display drive period of time in the display device according to the third embodiment of the present disclosure.

FIG. 13 schematically shows the operation in one frame period of time (1F). In the figure, an axis of abscissa represents time, and an axis of ordinate represents a position in a vertical direction in the display screen. It is noted that a vertical blanking period of time is omitted here for the sake of simplicity.

Figure 14:
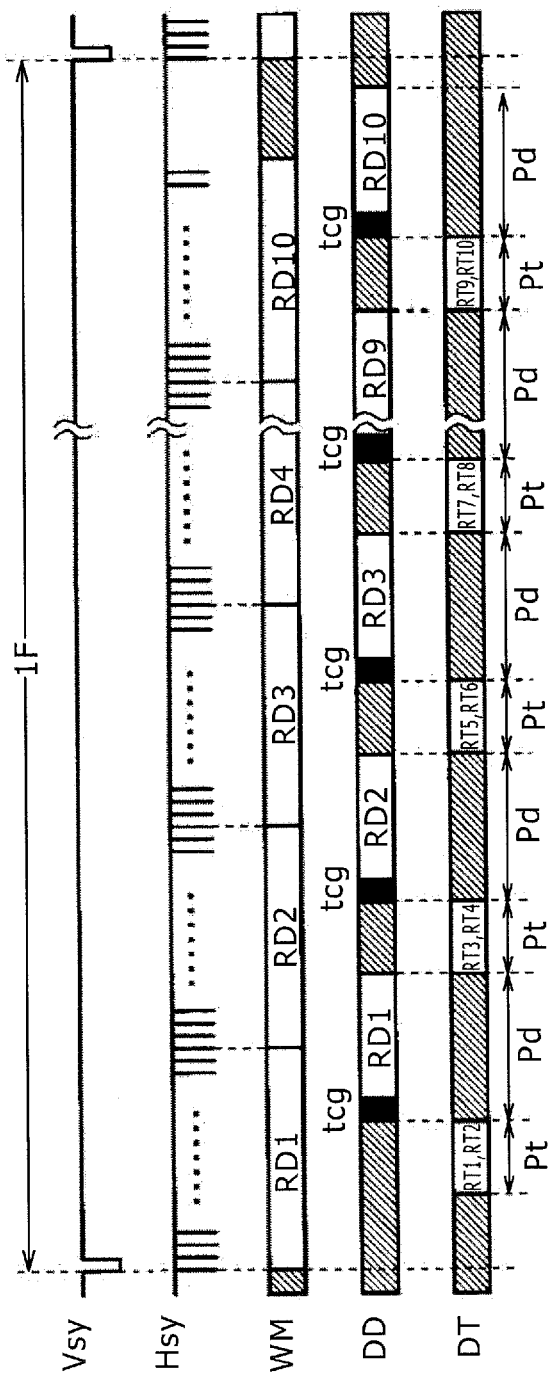
FIG. 14 is an explanatory diagram schematically showing the touch detection period of time and the display drive period of time in the display device according to the third embodiment of the present disclosure.

In addition, FIG. 14 represents a timing chart of the operation of the liquid crystal display device of the third embodiment, and shows waveforms of the vertical synchronous signal Vsy and the horizontal synchronous signal Hsy. Also, FIG. 14 shows the partial display area RD in which an image based on the video signal Vs written by the memory write (WM) operation is displayed, the partial display area RD becoming an object of the display drive (DD), and the partial detection area RT becoming an object of the touch detection drive (DT).

In one frame period of time, in this case, the ten touch detection periods of time Pt, and the ten display periods of time Pd are alternately disposed. Also, the touch detection drive DT is carried out in the touch detection period of time Pt, and the display drive DD is carried out in the display period of time Pd.

As previously described, the memory 1a writes thereto the data of 1/10 of the video information for one frame in order in increments of one horizontal line based on the video signal Vs, and the vertical synchronous signal Vsy, and the horizontal synchronous signal Hsy which are supplied thereto from the external host apparatus or the like (memory write WM). Also, the memory 1a writes thereto the new data of 1/10 in order in increments of one horizontal line while it overwrites the data on the last data of ⅒. Also, the memory 1a reads out therefrom the data thus written thereto in order in increments of one horizontal line at a higher speed than that of the write before the last data is erased by overwriting the next data on the last data. Also, both of the scanning line driver 3 and the signal line driver 2 drive the partial display areas RD of the liquid crystal display device 20 based on the data thus read out by the line-sequential scanning (display drive DD).

FIGS. 13 and 14 show a situation in which in such a manner, the memory 1a reads out therefrom the data written thereto in order in increments of one horizontal line at the higher speed than that of the write, and the display drive DD is carried out based on the data thus read out.

Therefore, a time width of the display period of time Pd for which the display drive DD is carried out becomes shorter than a time for which the memory 1a writes thereto the data of ⅒ of the video information for one frame.

A time which is ensured by shortening the display period of time Pd in such a manner is set as the touch detection period of time Pt. Also, by utilizing the touch detection period of time Pt, the touch detection drive DT is carried out every partial detection area RT.

As far as the touch detection drive DT concerned, as shown in FIGS. 13 and 14, for example, the two partial detection areas RT are successively selected as the drive object every touch detection period of time Pt. That is to say, in this case, the touch detection scanning in the touch detection surface is carried out at the scanning speed which is twice as high as that of the display scanning. For this reason, while the display scanning for one frame is carried out, the touch detection scanning is carried out twice. The touch detection scanning is frequently carried out in such a manner, whereby it is possible to quickly respond to the touch made by the external proximity object, and thus it is possible to improve the response characteristics for the touch.

Here, a description will now be given with respect to the application of the charge voltage by the signal line driver 2.

As shown in FIG. 14, in the liquid crystal display device of the third embodiment, the touch detection drive DT in the touch detection period of time Pt, and the display drive DD in the display period of time Pd are alternately carried out in one frame period of time.

In the case of a drive system in which the touch detection period of time Pt for which the touch detection scanning is carried out in such a manner, and the display period of time Pd for which the pixel signal write scanning for the display is carried out are separated from each other, the charge voltage is applied to the signal line SL at the timing of the boundary between both of the these periods, Pt, Pd, of time.

For example, in FIG. 14, there are shown the partial display areas RD1, RD2, . . . , RD10 in which the display drive DD is carried out so as to correspond to the display periods of time Pd. In this case, however, a charge period of time tcg is provided in a start portion of one horizontal period of time becoming a head line of each of the partial display areas RD1, RD2, . . . , RD10. Thus, the application of the charge voltage is carried out.

Figure 15:
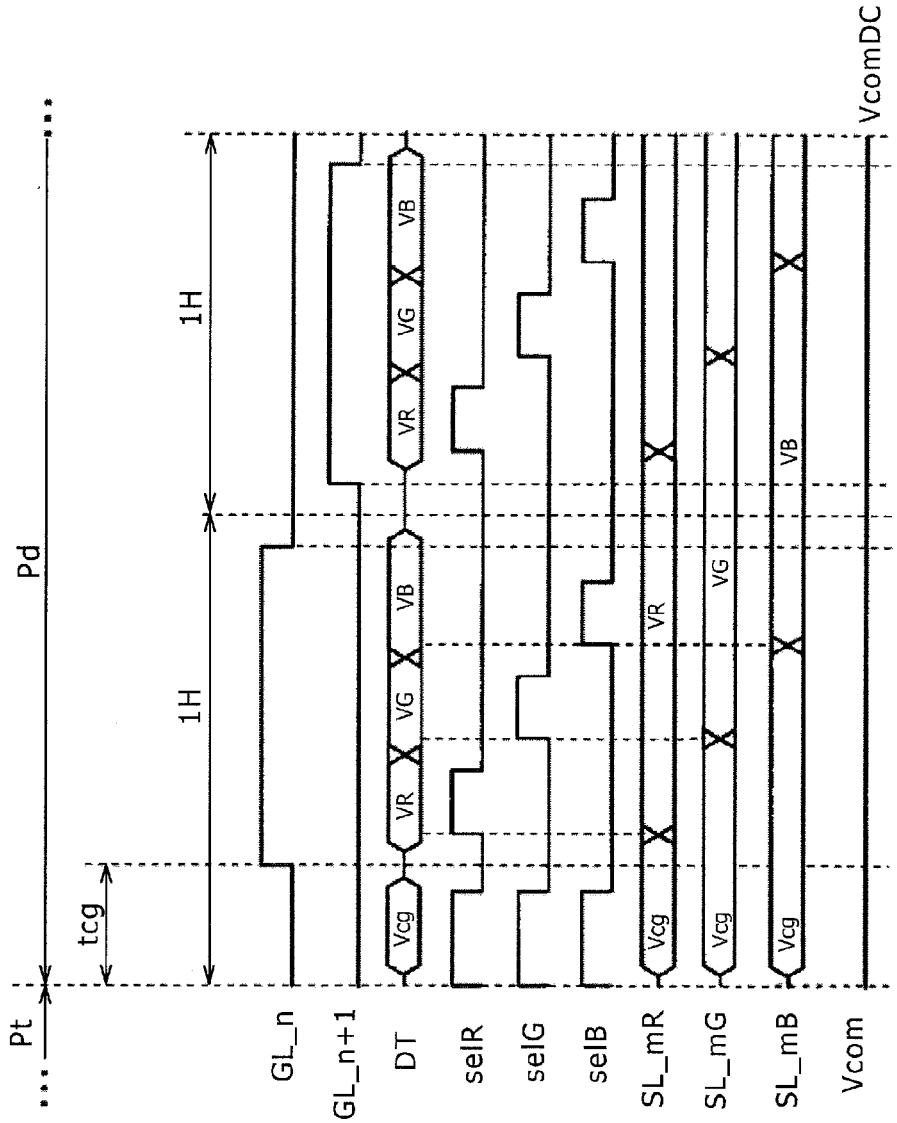
FIG. 15 is a waveform chart explaining a charge voltage application timing in the display device according to the third embodiment of the present disclosure.

FIG. 15 shows signal waveforms in the head 2H periods of time in each of the display period of time Pd. Also, FIG. 15 shows scanning pulses for the scanning lines GL_n and GL_n+1 supplied from the scanning line driver 3.

In addition, FIG. 15 shows the multiplexed pixel signals DT (DT_1 to DT_M) which the signal line driver 2 outputs to the multiplexing signal lines MSL (MSL_1 to MSL_M), respectively, the switch control signals sel (selR, selG, and selB) which the signal line driver 2 supplies to the selection switch portion 5, and signals which are supplied to the signal lines SL (SL_mR, SL_mG, and SL_mB). It is noted that the polarities of the pixel signal voltages VR, VG, and VB are not shown here for the sake of simplicity.

In addition, FIG. 15 shows the drive signal Vcom which the drive electrode driver 7 supplies to the drive electrodes CO. The drive signal Vcom is shown as the DC drive signal VcomDC because of the display period of time Pd.

As shown in the figure, the charge period of time tcg is set at the head timing of the display period of time Pd. Due to the charge period of time tcg, the scanning line driver 3 delays the scanning pulse for the scanning line GL_n.

Also, in the charge period of time tcg, the signal line driver 2 outputs the charge voltage Vcg to the multiplexing signal lines MSL, and turns ON all of the switches SWR, SWG, and SWB of the selection switch portion 5 in accordance with the switch control signals selR, selG, and selB, respectively.

As a result, the charge voltage Vcg is written to all of the signal lines SL.

The application of the charge voltage results in the longitudinal cross talk being improved similarly to the case of each of the first and second embodiments described above.

When like the case described above, the write scanning for the write of the pixel signals by the scanning line driver 3, and the detection scanning for the detection of the touch manipulation by the drive electrode driver 7 are carried out plural times in the time division manner for one frame period of time, the output of the charge voltage Vcg by the signal line driver 2 is caused to be carried out for the period of time becoming the boundary between the detection scanning and the write scanning.

The logic circuits for the scanning drive are formed in the signal line driver 2, the scanning line driver 3, and the drive electrode driver 7 in order to realize the divided operations for both of the display period of time Pd, and the touch detection period of time Pt. In this case, when the charge period of time tcg is set at the timing becoming the boundary between the periods of time in such a manner, it is possible to avoid the large change of the logic circuit. Also, it is possible to readily add the intermittent charge voltage applying operation in the liquid crystal display device utilizing such a division drive system.

It is noted that although in the case described above, for example, the application of the charge voltage is carried out in the head period of time in each of the ten display periods of time Pd in one frame, how many number of times the application of the charge voltage is carried out in one frame is as described in each of the first and second embodiments described above. As the number of times of the application of the charge voltage is further reduced, this is effective in reduction of the power consumption.

Therefore, it is also effective to carry out the application of the charge voltage in each of the head periods of time of the partial display periods of time Pd instead of carrying out the application of the charge voltage in each of the head periods of time of all of the display periods of time Pd.

That is to say, it is only necessary that the application of the charge voltage is carried out so as to fulfill the condition of the time interval Tcg for the application of the charge voltage described above.

In addition, the application of the charge voltage may also be carried out for the end period of time right before the proceeding to the touch detection period of time Pt instead of being carried out for the head period of time in the display period of time Pd.

5. Modified Changes

Although the first to third embodiments have been described so far, the configurations and structures of the liquid crystal display device described above are merely exemplified, and the structures of the pixels 10 are also exemplified.

In addition, the technique of the present disclosure can be applied to the display device irrespective of a normally white display device and a normally black display device.

Also, the technique of the present disclosure can be applied to the device configuration and structure used in various kinds of liquid crystal display devices.

In addition, the display device according to the embodiment of the present disclosure can be generally applied not only to the liquid crystal display device as the active matrix type display device, but also to a plasma display device, an organic EL display device or the like.

6. Fourth Embodiment (Electronic Apparatus)

An electronic apparatus according to a fourth embodiment of the present disclosure includes the display device according to the first embodiment of the present disclosure. In this case, as described above, the display device includes the pixel array portion 4, the plural scanning lines GL_1 to GL_N, the plural signal lines SL_1R to SL_MB, the scanning line driver 3, and the signal line driver 2. In this case, the plural pixels 10 in which the display gradations are controlled in accordance with the written pixel signals are disposed in the row direction and in the column direction through the pixel array portion 4. The plural scanning lines GL_1 to GL_N are disposed in the pixel array portion 4 and supply the scanning pulses for the pixels 10 in the rows. The plural signal lines SL_1R to SL_MB are disposed in the pixel array portion 4 and supply the pixel signals for the pixels 10 in the columns. The scanning line driver 3 successively supplies the scanning pulses to the plural scanning lines GL_1 to GL_N and causes the pixels 10 in the rows to carry out the write of the pixel signals outputted to the signal lines SL_1R to SL_MB. Also, the signal line driver 2 outputs the pixel signals for the pixels 10 to the plural signal lines SL_1R to SL_MB, and intermittently outputs the charge voltage with lower electric potential than the predetermined pixel signal voltage once or more for one frame period of time to each of the plural signal lines SL_1R to SL_MB.

It is noted that although the electric apparatus of the fourth embodiment includes the liquid crystal display device of the first embodiment, the present disclosure is by no means limited thereto and thus the electric apparatus may also include any of the liquid crystal display device of the second and third embodiments, and the modified changes of the first to third embodiments.

7. Examples of Application (Electronic Apparatus)

Next, a description will be given with respect to examples of application of the liquid crystal display device according to the first embodiment of the present disclosure described above with reference to FIG. 16 to FIGS. 20A to 20E. The display device of the first embodiment described above can be applied to the display devices, of electronic apparatuses in all the fields, in each of which a video signal inputted from the outside to the electronic apparatus, or a video signal generated in the electronic apparatus is displayed in the form of an image or a video image. In this case, the electronic apparatuses include a television set, a digital camera, a notebook-size personal computer, mobile terminal equipment such as a mobile phone, and a video camera.

First Examples of Application

Figure 16:
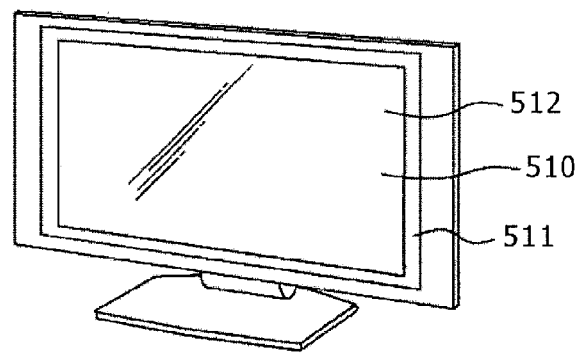
FIG. 16 is a perspective view showing an external appearance of a television set as a first example of application to which the display device according to the first embodiment of the present disclosure is applied.

FIG. 16 is a perspective view showing an external appearance of a television set as a first example of application to which the liquid crystal display device of the first embodiment is applied. The television set, for example, includes an image display screen portion 510 composed of a front panel 511 and a filter glass 512. In this case, the image display screen portion 510 is composed of the liquid crystal display device of the first embodiment described above.

Second Example of Application

Figure 17:
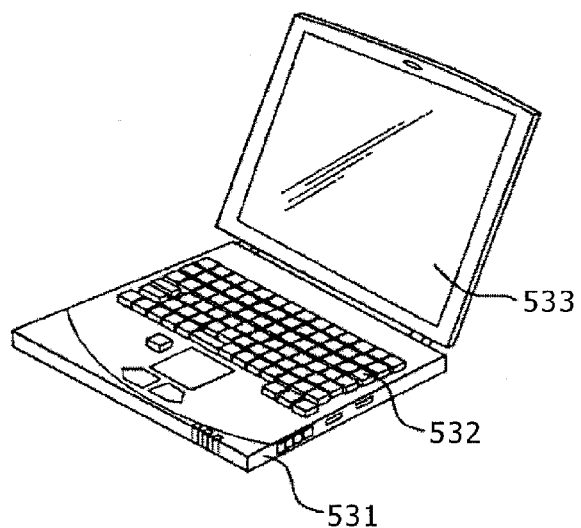
FIG. 17 is a perspective view showing an external appearance of a notebook-size personal computer as a second example of application to which the display device according to the first embodiment of the present disclosure is applied.

FIG. 17 is a perspective view showing an external appearance of a notebook-size personal computer as a second example of application to which the display device of the first embodiment described above is applied. The notebook-size personal computer, for example, includes a main body 531, a keyboard 532 which is manipulated when characters or the like are inputted, and a display portion 533 for displaying thereon an image. In this case, the display portion 533 is composed of the liquid crystal display device of the first embodiment described above.

Third Example of Application

Figure 18:
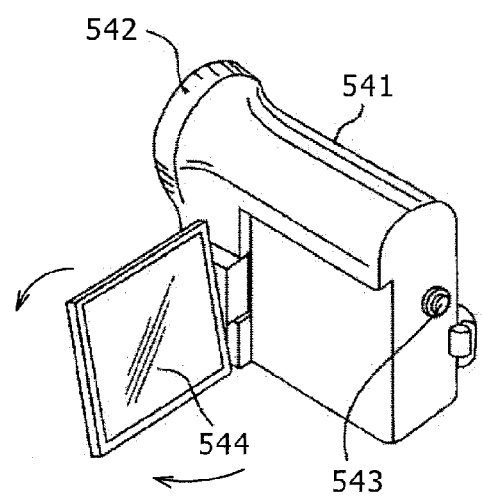
FIG. 18 is a perspective view showing an external appearance of a video camera as a third example of application to which the display device according to the first embodiment of the present disclosure is applied.

FIG. 18 is a perspective view showing an external appearance of a video camera as a third example of application to which the liquid crystal display device of the first embodiment described above is applied. The video camera, for example, includes a main body portion 541, a lens 542 which captures an image of a subject and which is provided on a side surface directed forward, a start/stop switch 543 which is manufactured when an image of a subject is captured, and a display portion 544. In this case, the display portion 544 is composed of the display device of the first embodiment described above.

Fourth Example of Application

Figure 19A:
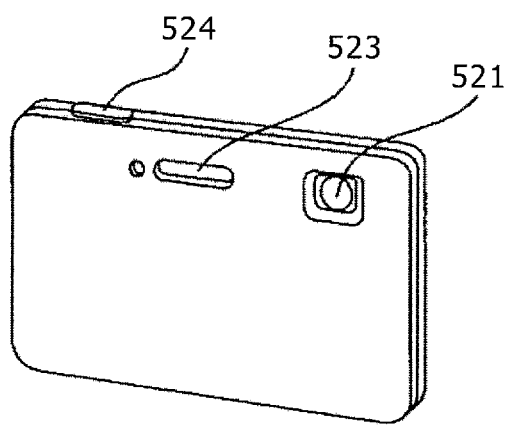
FIGS. 19A and 19B are respectively a perspective view showing an external appearance of a digital camera as a fourth example of application, when viewed from a front side, to which the display device according to the first embodiment of the present disclosure is applied, and a perspective view showing an external appearance of the digital camera as the fourth example of application, when viewed from a back side, to which the display device according to the first embodiment of the present disclosure is applied.
Figure 19B:
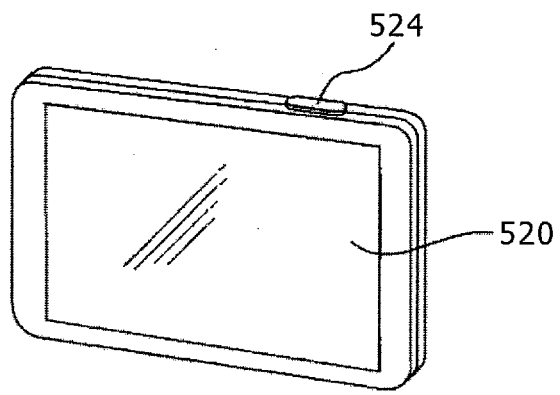

FIGS. 19A and 19B are perspective views showing respective external appearances of a digital camera as a fourth example of application to which the liquid crystal display device of the first embodiment described above is applied. Also, FIG. 19A shows the external appearance on a front surface side, and FIG. 19B shows the external appearance on a back surface side. The digital camera, for example, includes a display portion 520 with a touch panel, an image capturing lens 521, a light emitting portion 523 for flash, and a shutter button 524. In this case, the display portion 520 is composed of the liquid crystal display device of the first embodiment described above.

Fifth Example of Application

FIGS. 19A to 19E are views showing respective external appearances of a mobile phone as a fifth example of application to which the liquid crystal display device of the first embodiment described above is applied. FIG. 20A shows a manipulation surface and a display surface in a state in which a chassis is opened. FIG. 20B shows an upper surface side in a state in which the chassis is closed, and FIG. 20C shows a bottom surface side in the state in which the chassis is closed. Also, FIGS. 20D and 20E are respectively perspective views from the upper surface side and the bottom surface side in the state in which the chassis is closed.

The mobile phone, for example, is constructed such that an upper chassis 550 and a lower chassis 551 are coupled to each other through a coupling portion (hinge portion) 556. The mobile phone, for example, includes a display portion 552, a sub-display portion 553, a key manipulation portion 554, and a camera 555. In this case, either the display portion 552 or the sub-display portion 553 is composed of the liquid crystal display device of the first embodiment described above.

It should be noted that although the liquid crystal display device of the first embodiment described above is applied to each of the first to fifth examples of application, the present disclosure is by no means limited thereto and thus the liquid crystal display device of any of the second and third embodiments, and the modified changes of the first to third embodiments can also be applied to each of the first to fifth examples of application.

It is noted that the present disclosure can also adopt the following constitutions.

(1) A display device including: a pixel array portion in which plural pixels in which display gradations are controlled in accordance with written pixel signals are disposed in a row direction and in a column direction; plural scanning lines disposed in the pixel array portion and supplying scanning pulses for the pixels in the rows; plural signal lines disposed in the pixel array portion and supplying the pixel signals for the pixels in the columns; a scanning line driver successively supplying the scanning pulses to the plural scanning lines and causing the pixels in the rows to carry out write of the pixel signals outputted to the signal lines; and a signal line driver outputting the pixel signals for the pixels to the plural signal lines, and intermittently outputting a charge voltage with lower electric potential than a predetermined pixel signal voltage once or more for one frame period of time to each of the plural signal lines.

(2) The display device described in the paragraph (1), in which the signal line driver outputs the charge voltage to the signal lines at a frequency in which an electric potential of a channel portion of a pixel transistor which is controlled in accordance with the scanning pulse in the pixel is prevented from becoming higher than that of the pixel signal written to the pixel capacitor due to a leakage current.

(3) The display device described in any one of the paragraph (1) or (2), in which a time interval Tcg at which the signal line driver outputs the charge voltage is expressed by:

$$Tcg \leq Cch \times (VgL - Vcg)/(Ipx + Ips)$$

where Cch is a capacitance of the channel portion of the pixel transistor, VgL is the predetermined pixel signal voltage, Vcg is the charge voltage, Ipx is a pixel transistor leakage current caused to flow from the pixel capacitor side to the channel portion, and Ips is a pixel transistor leakage current caused to flow from the signal line side to the channel portion.

(4) The display device described in any one of the paragraph (1) to (3), in which the charge voltage is set as a voltage falling within a range of being equal to or lower than a negative-polarity electric potential of a drive maximum gradation of the pixel signal, and being equal to higher than a gate electric potential in an OFF phase of a pixel transistor which is controlled in accordance with the scanning pulse in the pixel.

(5) The display device described in any one of the paragraph (1) to (4), in which the signal line driver outputs the charge voltage to the signal lines at a timing after a negative-polarity pixel signal is outputted.

(6) The display device described in any one of the paragraph (1) to (5), further including: a touch panel portion disposed so as to be superposed on a display area based on said pixel array; and a detection scanning portion that performs detection scanning and obtains a touch signal to detect a touch on said touch panel portion, in which the scanning line driver performs write scanning to write pixel signal, the detection scanning portion performs detection scanning for to detect touch detection, the write scanning and the detection scanning are performed plural times for one frame period in a time division manner; and the charge voltage is output by said signal line driver for a period between the detection scanning and the write scanning.

(7) A display driving method for use in a display device including a pixel array portion in which plural pixels in which display gradations are controlled in accordance with written pixel signals are disposed in a row direction and in a column direction, plural scanning lines disposed in the pixel array portion and supplying scanning pulses for the pixels in the rows, plural signal lines disposed in the pixel array portion and supplying the pixel signals for the pixels in the columns, a scanning line driver, and a signal line driver, the display driving method including: successively supplying the scanning pulses to the plural scanning lines and causing the pixels in the rows to carry out write of the pixel signals outputted to the signal lines by the scanning line driver; and outputting the pixel signals for the pixels to the plural signal lines, and intermittently outputting a charge voltage with lower electric potential than a predetermined pixel signal voltage once or more for one frame period of time to each of the plural signal lines by the signal line driver.

(8) An electronic apparatus including: a display device; in which the display device includes a pixel array portion in which plural pixels in which display gradations are controlled in accordance with written pixel signals are disposed in a row direction and in a column direction; plural scanning lines disposed in the pixel array portion and supplying scanning pulses for the pixels in the rows; plural signal lines disposed in the pixel array portion and supplying the pixel signals for the pixels in the columns; a scanning line driver successively supplying the scanning pulses to the plural scanning lines and causing the pixels in the rows to carry out write of the pixel signals outputted to the signal lines; and a signal line driver outputting the pixel signals for the pixels to the plural signal lines, and intermittently outputting a charge voltage with lower electric potential than a predetermined pixel signal voltage once or more for one frame period of time to each of the plural signal lines.

The present application contains subject matter related to that disclosed in Japanese Priority Patent Application JP 2012-049117 filed in the Japan Patent Office on Mar. 6, 2012, the entire content of which is hereby incorporated by reference.

What is claimed is:

1. A display device comprising:
a pixel array portion including plural pixels in which display gradations of the plural pixels are controlled in accordance with written pixel signals, the plural pixels are disposed in a row direction and in a column direction;
plural scanning lines disposed in said pixel array portion and supplying scanning pulses to the pixels in the rows;
plural signal lines disposed in said pixel array portion and supplying the pixel signals to the pixels in the columns;
a scanning line driver successively supplying the scanning pulses to said plural scanning lines and causing the pixels in the rows to carry out write of the pixel signals outputted to the signal lines; and
a signal line driver outputting the pixel signals for the pixels to said plural signal lines, wherein
the signal line driver outputs, at least once in a frame period, a charge voltage with lower electric potential than a predetermined pixel signal voltage to each of said plural signal lines, the charge voltage being output in less than all horizontal periods of the frame period;

an electric potential of a channel portion of a pixel transistor is controlled in accordance with the scanning pulse in the pixel;

said signal line driver outputs the charge voltage to said signal lines at a frequency such that the electric potential of the channel portion of the pixel transistor is less than an electric potential of the pixel signal written to a pixel capacitor due to a leakage current; and a time interval Tcg at which said signal line driver outputs the charge voltage is expressed by:

$$Tcg \leq Cch \times (VgL-Vcg)/(Ipx+Ips)$$

where Cch is a capacitance of said channel portion of said pixel transistor, VgL is the predetermined pixel signal voltage, Vcg is the charge voltage, Ipx is a pixel transistor leakage current caused to flow from the pixel capacitor to said channel portion, and Ips is a pixel transistor leakage current caused to flow from the signal line to said channel portion.

2. The display device according to claim 1, wherein the charge voltage is set as a voltage falling within a range of being equal to or lower than a negative-polarity electric potential of a drive maximum gradation of the pixel signal, and being equal to or higher than a gate electric potential in an OFF phase of a pixel transistor which is controlled in accordance with the scanning pulse in the pixel.

3. The display device according to claim 1, wherein said signal line driver outputs the charge voltage to said signal lines at a timing after a negative-polarity pixel signal is outputted.

4. The display device according to claim 1, further comprising
a touch panel portion disposed so as to be superposed on a display area based on said pixel array; and
a detection scanning portion that performs detection scanning and obtains a touch signal to detect a touch on said touch panel portion, wherein
the scanning line driver performs write scanning to write pixel signal,
the detection scanning portion performs detection scanning to detect touch,
the write scanning and the detection scanning are performed plural times for one frame period in a time division manner; and
the charge voltage is output by said signal line driver for a period between the detection scanning and the write scanning.

5. A display driving method for use in a display device including a pixel array portion containing plural pixels in which display gradations of the plural pixels are controlled in accordance with written pixel signals and which are disposed in a row direction and in a column direction, plural scanning lines disposed in said pixel array portion and supplying scanning pulses to the pixels in the rows, plural signal lines disposed in said pixel array portion and supplying the pixel signals to the pixels in the columns, a scanning line driver, and a signal line driver, said display driving method comprising:
successively supplying the scanning pulses to said plural scanning lines and causing the pixels in the rows to carry out write of the pixel signals outputted to the signal lines by said scanning line driver;
outputting the pixel signals for the pixels to said plural signal lines,
outputting, at least once per frame period, a charge voltage with lower electric potential than a predetermined pixel signal voltage to each of said plural signal lines by said signal line driver, the charge voltage being output in less than all horizontal periods of the frame period; and
an electric potential of a channel portion of a pixel transistor being controlled in accordance with the scanning pulse in the pixel,
outputting the charge voltage by said signal line driver to said signal lines at a frequency in such a manner that the electric potential of the channel portion of the pixel transistor is less than an electric potential of the pixel signal written to a pixel capacitor due to a leakage current, wherein
a time interval Tcg at which said signal line driver outputs the charge voltage is expressed by:

$$Tcg \leq Cch \times (VgL-Vcg)/(Ipx+Ips)$$

where Cch is a capacitance of said channel portion of said pixel transistor, VgL is the predetermined pixel signal voltage, Vcg is the charge voltage, Ipx is a pixel transistor leakage current caused to flow from the pixel capacitor to said channel portion, and Ips is a pixel transistor leakage current caused to flow from the signal line to said channel portion.

6. An electronic apparatus including a display device, said display device comprises:
a pixel array portion including plural pixels in which display gradations of the plural pixels are controlled in accordance with written pixel signals, the plural pixels are disposed in a row direction and in a column direction;
plural scanning lines disposed in said pixel array portion and supplying scanning pulses to the pixels in the rows;
plural signal lines disposed in said pixel array portion and supplying the pixel signals to the pixels in the columns;
a scanning line driver successively supplying the scanning pulses to said plural scanning lines and causing the pixels in the rows to carry out write of the pixel signals outputted to the signal lines; and
a signal line driver outputting the pixel signals for the pixels to said plural signal lines, wherein
the signal line driver outputs, at least once in a frame period, a charge voltage with lower electric potential than a predetermined pixel signal voltage to each of said plural signal lines, the charge voltage being output in less than all horizontal periods of the frame period;
an electric potential of a channel portion of a pixel transistor is controlled in accordance with the scanning pulse in the pixel;
said signal line driver outputs the charge voltage to said signal lines at a frequency such that the electric potential of the channel portion of the pixel transistor is less than an electric potential of the pixel signal written to a pixel capacitor due to a leakage current; and a time interval Tcg at which said signal line driver outputs the charge voltage is expressed by:

$$Tcg \leq Cch \times (VgL-Vcg)/(Ipx+Ips)$$

where Cch is a capacitance of said channel portion of said pixel transistor, VgL is the predetermined pixel signal voltage, Vcg is the charge voltage, Ipx is a pixel transistor leakage current caused to flow from the pixel capacitor to said channel portion, and Ips is a pixel transistor leakage current caused to flow from the signal line to said channel portion.

7. The electronic apparatus according to claim 6, wherein the charge voltage is set as a voltage falling within a range of being equal to or lower than a negative-polarity electric potential of a drive maximum gradation of the pixel signal, and being equal to or higher than a gate electric potential in an OFF phase of a pixel transistor which is controlled in accordance with the scanning pulse in the pixel.

8. The electronic apparatus according to claim 6, wherein said signal line driver outputs the charge voltage to said signal lines at a timing after a negative-polarity pixel signal is outputted.

* * * * *